United States Patent
Dickins et al.

(10) Patent No.: US 9,460,729 B2
(45) Date of Patent: Oct. 4, 2016

(54) LAYERED APPROACH TO SPATIAL AUDIO CODING

(71) Applicants: DOLBY LABORATORIES LICENSING CORPORATION, San Francisco, CA (US); DOLBY INTERNATIONAL AB, Amsterdam Zuidoost (NL)

(72) Inventors: Glenn Dickins, Como (AU); Heiko Purnhagen, Sundbyberg (SE); Leif Jonas Samuelsson, Sundbyberg (SE)

(73) Assignees: Dolby Laboratories Licensing Corporation, San Francisco, CA (US); Dolby International AB, Amsterdam Zuidoost (NL)

( * ) Notice: Subject to any disclaimer, the term of this patent is extended or adjusted under 35 U.S.C. 154(b) by 0 days.

(21) Appl. No.: 14/427,589

(22) PCT Filed: Sep. 10, 2013

(86) PCT No.: PCT/US2013/059025
§ 371 (c)(1),
(2) Date: Mar. 11, 2015

(87) PCT Pub. No.: WO2014/046916
PCT Pub. Date: Mar. 27, 2014

(65) Prior Publication Data
US 2015/0248889 A1     Sep. 3, 2015

Related U.S. Application Data

(60) Provisional application No. 61/703,857, filed on Sep. 21, 2012, provisional application No. 61/703,861, filed on Sep. 21, 2012, provisional application No. 61/703,855, filed on Sep. 21, 2012.

(51) Int. Cl.
*G10L 19/02* (2013.01)
*G10L 19/012* (2013.01)
(Continued)

(52) U.S. Cl.
CPC ......... *G10L 19/012* (2013.01); *G10L 19/0208* (2013.01); *G10L 21/0208* (2013.01); *H04M 3/56* (2013.01); *G10L 19/008* (2013.01); *G10L 19/02* (2013.01); *G10L 21/0216* (2013.01)

(58) Field of Classification Search
USPC ...................................... 704/200.1, 500–504
See application file for complete search history.

(56) References Cited

U.S. PATENT DOCUMENTS 4,949,383 A   8/1990  Koh
5,651,090 A   7/1997  Moriya
(Continued)

FOREIGN PATENT DOCUMENTS

EP    1873753     1/2008
WO    2006/107833   10/2006
(Continued)

OTHER PUBLICATIONS

Tzagkarakis, C. et al "A Multichannel Sinusoidal Model Applied to Spot Microphone Signals for Immersive Audio" IEEE Transactions on Audio, Speech and Language Processing, v. 17, No. 8, p. 1483-1497, Nov. 2009.
(Continued)

*Primary Examiner* — Abul Azad

(57) ABSTRACT

The invention provides a layered audio coding format with a monophonic layer and at least one sound field layer. A plurality of audio signals is decomposed, in accordance with decomposition parameters controlling the quantitative properties of an orthogonal energy-compacting transform, into rotated audio signals. Further, a time-variable gain profile specifying constructively how the rotated audio signals may be processed to attenuate undesired audio content is derived. The monophonic layer may comprise one of the rotated signals and the gain profile. The sound field layer may comprise the rotated signals and the decomposition parameters. In one embodiment, the gain profile comprises a cleaning gain profile with the main purpose of eliminating non-speech components and/or noise. The gain profile may also comprise mutually independent broadband gains. Because signals in the audio coding format can be mixed with a limited computational effort, the invention may advantageously be applied in a tele-conferencing application.

18 Claims, 8 Drawing Sheets

(51) Int. Cl.
*H04M 3/56* (2006.01)
*G10L 21/0208* (2013.01)
*G10L 19/008* (2013.01)
*G10L 21/0216* (2013.01)

(56) References Cited

U.S. PATENT DOCUMENTS

| | | | |
|---|---|---|---|
| 5,727,119 A * | 3/1998 | Davidson | H04B 1/665 |
| | | | 375/240 |
| 5,815,097 A | 9/1998 | Schwartz | |
| 5,903,872 A * | 5/1999 | Fielder | G11B 27/031 |
| | | | 704/224 |
| 6,226,608 B1 * | 5/2001 | Fielder | G10L 19/022 |
| | | | 345/545 |
| 6,591,241 B1 | 7/2003 | Absar | |
| 6,615,169 B1 | 9/2003 | Ojala | |
| 6,751,477 B1 | 6/2004 | Alperovich | |
| 6,802,035 B2 | 10/2004 | Catreux | |
| 7,283,957 B2 | 10/2007 | Minde | |
| 7,420,935 B2 | 9/2008 | Virolainen | |
| 7,432,950 B2 | 10/2008 | Deleam | |
| 7,590,181 B2 | 9/2009 | Awad | |
| 7,593,032 B2 | 9/2009 | Civanlar | |
| 7,656,948 B2 | 2/2010 | Seong | |
| 7,991,238 B2 | 8/2011 | Malvar | |
| 8,036,904 B2 | 10/2011 | Myburg | |
| 8,050,914 B2 | 11/2011 | Schmidt | |
| 8,103,006 B2 | 1/2012 | McGrath | |
| 8,271,276 B1 | 9/2012 | Muesch | |
| 8,626,503 B2 | 1/2014 | Schuijers | |
| 2002/0128826 A1 | 9/2002 | Kosaka | |
| 2003/0215013 A1 | 11/2003 | Budnikov | |
| 2005/0013309 A1 | 1/2005 | Ravishankar | |
| 2005/0249277 A1 | 11/2005 | Ratakonda | |
| 2006/0007914 A1 | 1/2006 | Chandra | |
| 2006/0013416 A1 | 1/2006 | Truong | |
| 2006/0018378 A1 | 1/2006 | Piccinelli | |
| 2006/0085200 A1 | 4/2006 | Allamanche | |
| 2007/0291951 A1 | 12/2007 | Faller | |
| 2008/0068446 A1 | 3/2008 | Barkley | |
| 2008/0101466 A1 | 5/2008 | Swenson | |
| 2008/0140396 A1 | 6/2008 | Grosse-Schulte | |
| 2008/0158339 A1 | 7/2008 | Civanlar | |
| 2008/0255832 A1 | 10/2008 | Goto | |
| 2009/0083044 A1 | 3/2009 | Briand | |
| 2009/0083045 A1 * | 3/2009 | Briand | G10L 19/24 |
| | | | 704/500 |
| 2009/0295905 A1 | 12/2009 | Civanlar | |
| 2009/0296958 A1 | 12/2009 | Sugiyama | |
| 2010/0042747 A1 | 2/2010 | Hascalovici | |
| 2010/0063828 A1 | 3/2010 | Ishikawa | |
| 2010/0083344 A1 * | 4/2010 | Schildbach | H03G 7/007 |
| | | | 725/151 |
| 2010/0106509 A1 * | 4/2010 | Shimada | G10L 19/0208 |
| | | | 704/500 |
| 2010/0169080 A1 | 7/2010 | Tsuchinaga | |
| 2010/0191536 A1 | 7/2010 | Sampat | |
| 2010/0198588 A1 * | 8/2010 | Sudo | G10L 21/038 |
| | | | 704/205 |
| 2010/0198589 A1 | 8/2010 | Ishikawa | |
| 2010/0229210 A1 | 9/2010 | Sharp | |
| 2010/0293584 A1 | 11/2010 | Civanlar | |
| 2010/0322429 A1 | 12/2010 | Norvell | |
| 2011/0035212 A1 | 2/2011 | Briand | |
| 2011/0039506 A1 | 2/2011 | Lindahl | |
| 2011/0063407 A1 | 3/2011 | Wang | |
| 2011/0093276 A1 | 4/2011 | Ramo | |
| 2011/0153816 A1 | 6/2011 | Lloyd | |
| 2011/0154417 A1 | 6/2011 | Civanlar | |
| 2011/0224994 A1 | 9/2011 | Norvell | |
| 2011/0274156 A1 | 11/2011 | Mighani | |
| 2011/0295598 A1 | 12/2011 | Yang | |
| 2012/0057715 A1 | 3/2012 | Johnston | |
| 2012/0082319 A1 | 4/2012 | Jot | |
| 2012/0101826 A1 | 4/2012 | Visser | |
| 2013/0035943 A1 * | 2/2013 | Yamanashi | G10L 19/24 |
| | | | 704/500 |

FOREIGN PATENT DOCUMENTS

| | | |
|---|---|---|
| WO | 2007/035147 | 3/2007 |
| WO | 2009/068083 | 6/2009 |
| WO | 2011/071610 | 6/2011 |
| WO | 2012/058229 | 5/2012 |
| WO | 2014/044812 | 3/2014 |
| WO | 2014/046944 | 3/2014 |

OTHER PUBLICATIONS

Yang, D. et al "High-Fidelity Multichannel Audio Coding with Karhunen-Loeve Transform", IEEE Transactions on Speech and Audio Processing, New York, USA, vol. 11, No. 4, Jul. 1, 2003, pp. 365-380.

Briand, Manuel "Etudes D'Algorithmes D'Extraction des Informations de Spatialisation Sonore: Application Aux Formats Multicanaux" Mar. 20, 2007, pp. 1-240.

Faller, C. et. al. "Directional Audio Coding: Filterbank and STFT-Based Design", AES Convention May 20, 2006, New York, USA.

Duval, Benjamin "Etudes de Techniques d'Extraction de l'information spatiale dans une scene sonore multicanal" Sep. 30, 2006, pp. 1-72.

Elfitri, I. et al. "Multichannel Audio Coding Based on Analysis by Synthesis" Proceedings of the IEEE, Apr. 2011, vol. 9, Issue 4.

Beack, S. et al "Spatial Cue Based Sound Scene Control for MPEG Surround", Aug. 8, 2007, IEEE Multimedia and Expo. pp. 1886.

Boakye, Kofi Agyeman "Audio Segmentation for Meetings Speech Processing" May 2009, EECS Department of University of California.

Seefeldt, Alan "Loudness Domain Signal Processing" AES presented at the 123rd Convention, Oct. 5-8, 2007, New York, USA.

Robinson, C.Q. et al. "Dynamic Range Control via Metadata" AES presented at the 107th Convention, New York, USA Sep. 24-27, 1999.

Herre, J. et al "Interactive Teleconferencing Combining Spatial Audio Object Coding and DirAC Technology", AES Convention, May 2010.

DVB Organization: "CM-AVC006 Summary of Enhanced AC-3" Digital Video Broadcasting, May 27, 2004, p. 4.

Chandra, S. P et al "Audio Mixer for Multi-Party Conferencing in VoIP" IEEE International Conference on Internet Multimedia Services Architecture and Applications, Dec. 9, 2009, pp. 1-6.

Pulkki, V. et al "Directional Audio Coding Perception-based Reproduction of Spatial Sound" International Workshop on the Principles and Applications of Spatial Hearing, Nov. 11-13, 2009, Zao, Miyagi, Japan.

Samanta, V. et al "Impact of Video Encoding Parameters on Dynamic Video Transcoding" First International Conference on Communication System Software and Middleware, Jan. 8-12, 2006, New Delhi, India, pp. 1-9.

Jammeh, E. et al "Smoothing Transcoded MPEG-1 Video Streams for Internet Transmission" IEEE Proceedings on Vision, Image and Signal Processing, vol. 151, Issue 4, published on Aug. 30, 2004, pp. 298-305.

Del Galdo, G. et al "Efficient Methods for High Quality Merging of Spatial Audio Streams in Directional Audio Coding" AES Convention, May 2009.

* cited by examiner

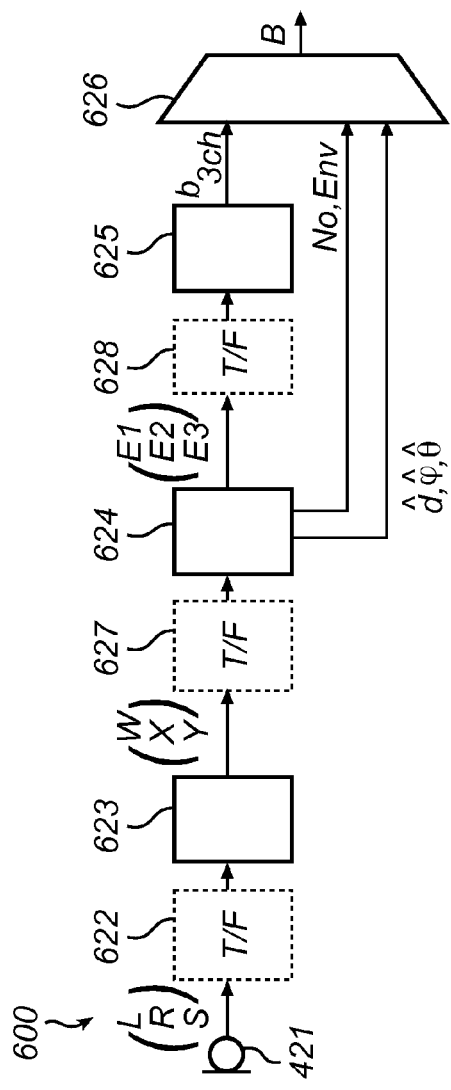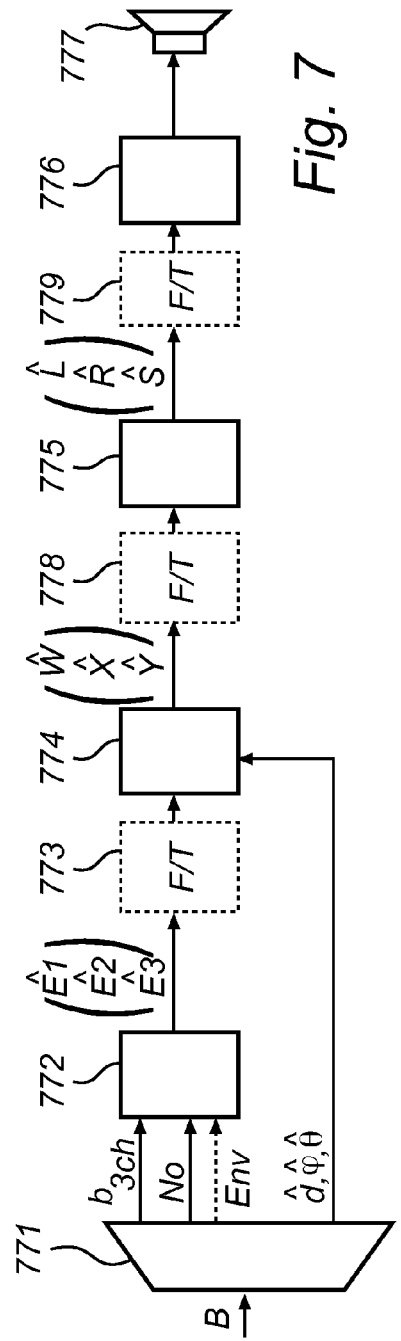

LAYERED APPROACH TO SPATIAL AUDIO CODING

CROSS-REFERENCE TO RELATED APPLICATIONS

This application claims priority to U.S. Provisional Patent Application No. 61/703,857 filed 21 Sep. 2012, U.S. Provisional Patent Application No. 61/703,861 filed 21 Sep. 2012 and U.S. Provisional Patent Application No. 61/703,855 filed 21 Sep. 2012, each of which is hereby incorporated by reference in its entirety.

TECHNICAL FIELD

The invention relates to systems and methods for encoding and decoding of spatially layered audio signals.

BACKGROUND

It has been proposed to employ layered coding of audio and video transmitted in video conferencing and telephone conferencing systems. For example, U.S. Pat. No. 7,593,032, issued Sep. 22, 2009 to Civanlar et al., discloses a video conferencing system in which transmitted audio and video are encoded using a layered coding scheme, and in which all or some of the layers of a full set of layers of the encoded video or audio may be transmitted.

It has also been proposed to encode audio data so that the encoded audio includes a monophonic layer and directional metadata which can be used (e.g., in a tele-conferencing system) to render the monophonic audio content as an output sound field (e.g., for playback on multiple loudspeakers). See, for example, V. Pulkki, et al., "Directional Audio Coding. Perception-based Reproduction of Spatial Sound," in International Workshop on the Principles and Applications of Spatial Hearing, Nov. 11-13, 2009, Zao, Miyagi, Japan.

However, until the present invention, it had not been known how to provide a spatially layered, encoded audio signal, with layers enabling a variety of benefits (described hereinbelow), including provision of a perceptually continuous teleconferencing listening experience at endpoints of a tele-conferencing system, or to provide a spatially layered, encoded audio signal so as to provide a mix of sound field and monophonic layers which varies over time (e.g., in a continuous manner) to endpoints of a conferencing system during a tele-conference.

BRIEF DESCRIPTION OF THE DRAWINGS

Example embodiments of the invention will be described with reference to the accompanying drawings, on which:

FIG. 6 shows an audio encoding system according to an embodiment of the invention;

FIG. 7 shows an audio decoding system according to an embodiment of the invention;

All the figures are schematic and generally only show parts which are necessary in order to elucidate the invention, whereas other parts may be omitted or merely suggested. Unless otherwise indicated, like reference numerals refer to like parts in different figures.

DETAILED DESCRIPTION

I. Overview a. Layered Coding

Figure 1:
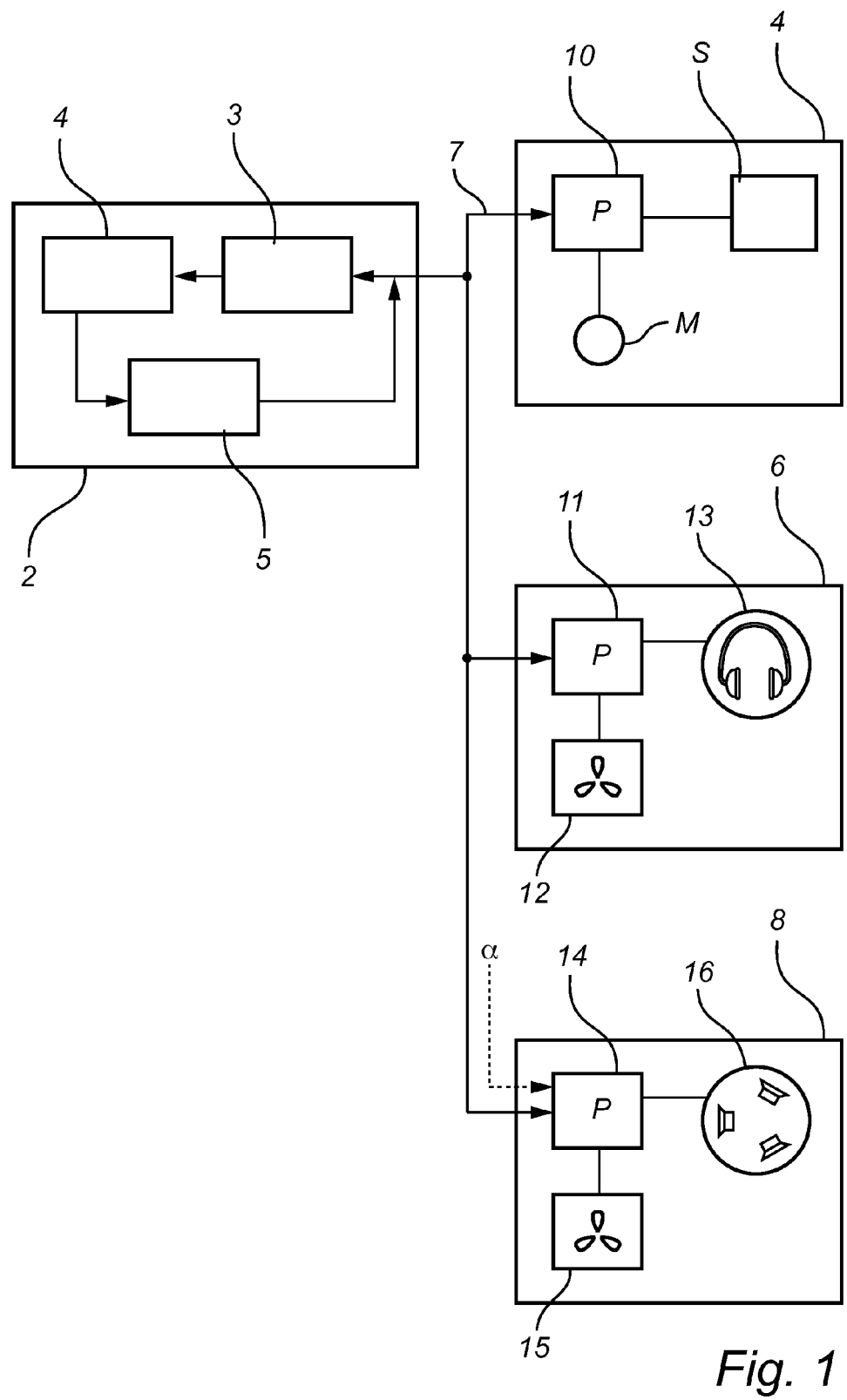
FIG. 1 is a block diagram of a tele-conferencing system acting as an audio transmission network according to an embodiment of the invention.

As used herein, an "audio signal" may be a pure audio signal or an audio part of an audiovisual signal or multimedia signal.

An example embodiment provides an audio encoding system comprising a spatial analyzer, an adaptive rotation stage and an analysis stage.

The spatial analyzer is configured to receive a plurality of audio signals, and to output decomposition parameters K based on the received plurality of audio signals. The plurality of audio signals may be split into time frames and a set of decomposition parameters may be determined for each of these time frames.

The plurality of audio signals may be of a number of different types/formats, such as fixed channel definition formats, e.g. three signals W, X, Y representing a horizontal first order sound field; four signals W, X, Y, Z representing a periophinic or three-dimensional sound field; three signals L, R, S representing a specific microphone geometry; specific speaker layouts like 5.1 sound with channels L, C, R, LS, RS; higher order horizontal B Format, higher order three-dimensional representations such as ambiosonics; other more or less equivalent sound field representations; or any arbitrary speaker layout with known orientations and decoded speaker feeds. The plurality of audio signals may be derived from an audio object driven format, such as the Dolby Atmos™ format or scripted audio (e.g. computer game audio rendering control). For simplicity, the plurality of audio signals will often be denoted by W, X, Y in this document, but it is to be noted, that the example embodiments described below are not limited to the plurality of audio signal having such a format. The number of decomposition parameters may be the same as the number of received audio signals, or the number of rotated audio signals, e.g. three or more. Alternatively, it may be higher or lower than these numbers.

The adaptive rotation stage is configured to receive the plurality of audio signals and to output a plurality of rotated audio signals. The adaptive rotation stage is configured to obtain the plurality of rotated audio signals by applying an adaptive energy-compacting orthogonal transformation (i.e. it applies an orthogonal transformation in order to achieve a decomposition, wherein the resulting rotated audio signals need not be orthogonal) of the received plurality of audio signals. Quantitative properties of the orthogonal transformation are determined by the decomposition parameters (which are provided by the spatial analyzer and which may optionally be output in quantized format). The adaptive rotation stage may be signal-adaptive in that it applies the orthogonal transformation in an independent fashion to each time frame of the plurality of audio signals (or a number of consecutive time frames of the audio signals), based on decomposition parameters associated with the respective time frame, whereby changes in properties such as energy/information contents of the plurality of audio signals may be taken into account when determining quantitative properties of the decomposition. Put differently, the decomposition parameters are updated for every frame or for every N frames, where N is a number of time frames corresponding to a duration of a fraction of a second, e.g., some tens of milliseconds. An effect of this is that the plurality of audio signals may be more efficiently encoded (i.e. the encoding requiring less coding bits per frame or bandwidth).

The plurality of rotated audio signals may have the same number of signals as the received plurality of audio signals, i.e. it may comprise for example three, four or even more signals. For example, the plurality of audio signals may be a horizontal sound field represented by three signals W, X, Y, and the plurality of rotated signals may then be three signals E1, E2, E3; or the plurality of audio signals may be a three-dimensional sound field represented by four signals W, X, Y, Z, and the plurality of rotated signals may then be four signals E1, E2, E3, E4. Alternatively, the plurality of rotated audio signals may have a lower number of signals than the received plurality of audio signals. For example, the adaptive rotation stage may be adapted to remove (or truncate) some of the received plurality of audio signals before applying the orthogonal transformation, or it may be adapted to remove (or truncate) some of the resulting rotated audio signals before outputting the plurality of rotated audio signals. For simplicity, the plurality of rotated audio signals will often be denoted by E1, E2, E3 in this document, but it is to be noted, that the example embodiments described below are not limited to the plurality of rotated audio signal having such a format.

Said plurality of rotated audio signals and the decomposition parameters are discretely decodable into a first sound field representation (of the sound represented by the plurality of audio signals W, X, Y). For example, the adaptive orthogonal energy-compacting transformation may be (at least approximately) invertible, such that a plurality of de-rotated audio signals $\hat{W}, \hat{X}, \hat{Y}$ (resembling and/or approximating the plurality of audio signals W, X, Y) may be obtained from the plurality of rotated audio signals.

The analysis stage is configured to output a time-variable gain profile g comprising at least one frequency-variable component which when applied to at least one (or all) of the plurality of rotated audio signals, or at least one signal derived therefrom (e.g. the de-rotated audio signals $\hat{W}, \hat{X}, \hat{Y}$, or another sound field representation of the plurality of rotated audio signals), attenuates non-voice content (e.g. noise, sibilance and/or reverb). By applying the gain profile to such signals, new signals may be obtained which may be more suitable for audio playback at an output endpoint (e.g. resulting in a more desirable listening experience) or for combining audio channels from different sources (e.g. in a server or mixer in a teleconferencing system).

The gain profile is time-variable in that it may be different for different time instants/time frames. The frequency-variable component comprised in g is frequency variable in that it may correspond to different gains (or amounts of attenuation) to be applied to different frequency components/bands of signals on which the gain profile is applied.

The frequency-variable component may be adapted to attenuate non-voice content in audio signals, such as noise content, sibilance content and/or reverb content (e.g. it may clean frequency content/components that are expected to convey sound other than speech or apply some frequency and time varying filter that may have otherwise been applied at the time of the input audio processing to arrive at a desired output for a particular purpose). The gain profile may comprise separate subcomponents for these different functional aspects. For example, the gain profile may comprise frequency-variable components from the group comprising: a noise gain for attenuating noise content, a sibilance gain for attenuating sibilance content, and a reverb gain for attenuating reverb content.

The gain profile may comprise frequency-variable components adapted for different playback modes, such as monophonic playback or sound field playback. For example, the gain profile may comprise a mono gain adapted to attenuate non-voice content in a single channel audio signal, such as e.g. the first rotated audio signal E1 of the rotated audio signals E1, E2, E3, in order to make the (the resulting attenuated version of) first rotated audio signal more adapted for monophonic playback (e.g. attenuating such types of non-voice components that may be particularly bad for achieving a good monophonic listening experience). Alternatively, or additionally, the gain profile may comprise a spatial gain (or sound field gain) adapted to attenuate non-voice content in a multi-channel audio signal, such as e.g. the plurality of rotated audio signals E1, E2, E3, in order to make the (the resulting attenuated version of) the rotated audio signals more adapted for spatial (and sound field in particular) playback (e.g., attenuating such types of non-voice components that may be particularly bad for achieving a good spatial listening experience).

The gain profile may comprise a time-variable broadband gain which may implement aspects of dynamic range control, such as leveling, or phrasing in accordance with utterances. For example, the gain profile may comprise (time-variable) broadband gain components, such as a voice activity gain for performing phrasing and/or voice activity gating and/or a level gain for adapting the loudness/level of the signals (e.g. to achieve a common level for different signals, for example when forming a combined audio signal from several different audio signals with different loudness/level).

The output of the audio decoding system may comprise the plurality of rotated audio signals, the decomposition parameters and the gain profile. From this output, several audio formats may be obtained. For example, a monophonic/mono audio format may be obtained by taking the first rotated audio signal E1, and optionally improving it for playback at an endpoint, or mixing in a server, by applying (the whole of, or part of) the gain profile. For example, only a subset of multiple components of the gain profile may be applied. Further, the applied components may be applied fully, or only partly, by rescaling them at the endpoint or server. Similarly, a sound field format may be obtained using the plurality of rotated audio signals and the decomposition parameters. Optionally, (the whole of, or part of) the gain profile may be applied to improve the output for playback at an endpoint, or mixing in a server. The gain profile may be applied to the rotated signals themselves, or the de-rotated signals obtainable from them.

The output may be more efficiently encoded, than would the mono and sound field formats separately, especially if both cleaned (gain profile applied at least partly) and un-cleaned (gain profile not applied) would be encoded separately. Moreover, the different formats are easily obtainable from the output of the encoding system without much processing/computing effort.

In some example embodiments, the analysis stage is further adapted to output spatial parameters Th based on the received plurality of audio signals. The spatial parameters Th are independent of the vector of decomposition parameters K, i.e. they are distinct from the decomposition parameters in general, but (at least some of the spatial parameters) may be related or correlated to the decomposition parameters, or to time averages of the decomposition parameters. The number of spatial parameters may be for example one, two, three, or any higher number. The spatial parameters are adapted for use in spatial synthesis of a first rotated audio signal, or a signal derived therefrom, into a second sound field representation (of the sound represented by the plurality of audio signals), wherein the first rotated audio signal is comprised in the plurality of audio signals. For example, a multi-signal representation may be obtainable from the first rotated audio signal by performing an upmix operation (e.g. involving decorrelation and/or filtering and mixing operations comprising, for example, panning and/or reverberation), based on the spatial parameters. The gain profile may be applied (fully or partially, e.g. possibly only some components of the gain profile may be used) to the first rotated audio signal before spatial synthesis, and/or the gain profile may be applied to the sound field representation obtained by the spatial synthesis.

The second sound field representation may be a lower cost/bandwidth alternative to the first sound field (obtainable from the decomposition parameters and the plurality of rotated audio signals) but is in general not equal to this. The second sound field representation may represent a more functional representation of the audio activity than the first sound field representation, for example effecting the position of the output rendered audio such that certain participants and audio from different end point locations are heard from desired directions which may be different than the directions originally observed at the capturing microphones.

In the present embodiment, the output of the audio encoding system may comprise the spatial parameters, in addition to the plurality of rotated audio signals, the decomposition parameters and the gain profile. Compared to the previously described embodiments, a second sound field representation (based on the first rotated audio signal and the spatial parameters) is also obtainable.

In some example embodiments, the analysis stage may receive the plurality of audio signals, or other signals derived therefrom, and it may determine at least one of (or both) the gain profile and the spatial parameters based on such received signals (i.e. either directly based on the plurality of audio signals or indirectly, via intermediate signals).

In some example embodiments, the plurality of audio signals may be divided into frequency bands, and (at least some of the components/units of) the audio decoding system may be adapted to treat/encode these frequency band independently. For example, the orthogonal transformation may be determined independently for the different frequency bands.

In some example embodiments, the plurality of rotated audio signals obtained from by the energy-compacting orthogonal transformation, may be ordered by energy (or entropy) contents in such a way that the first rotated audio signal is a dominating signal of the rotated audio signals. The dominating signal may have maximal energy (or maximal entropy). It is known in the art that some KLT-type transformations may have this or similar properties. The orthogonal transformation may be designed to place as much energy (entropy) as possible in the first rotated audio signal, so as to leave as little energy (entropy) as possible in the remaining rotated audio signals. In this way, the remaining rotated audio signals may be encoded using fewer bits and/or less bandwidth at the same level of accuracy. Hence, the plurality of rotated audio signals may be encoded more efficiently than the plurality of audio signals W, X, Y. In this connection, energy may be measured as the variance of the signal. The maximal energy may be the frame-wise maximum or the maximum over a sequence of frames (or it may be identified over a given analysis time frame of e.g. 5-100 ms). In example embodiments, where the energy-compacting orthogonal transformation is constrained to limit changes with respect to time, the dominant first signal may not correspond to a signal with highest momentary energy (or entropy) content. Rather, the dominant first signal may correspond to a signal with highest energy (or entropy) content on average, and/or in particular, for a spatially stationary audio input, the energy-compacting orthogonal transformation may converge in the sense that after some time, the dominant first rotated audio signal may correspond to a signal with highest energy (or entropy) content. In example embodiments where smoothened covariance matrices (in which the variances are diagonal elements) are used as basis for the orthogonal transformation, the dominant first signal may correspond to the maximal smoothened variance but not necessarily to the maximal non-smoothened variance. For a spatially stationary audio input, the relative sizes of the smoothened variances may (at least after some time) be similar to the relative sizes of the non-smoothened variances, and the dominant first rotated audio signal may therefore correspond to the maximal non-smoothened variance and hence to the maximal energy.

In some example embodiments, the adaptive energy compacting orthogonal transformation is constrained, so as to limit changes therein with respect to time, i.e. the energy compacting orthogonal transformation may change over time, but not faster than a certain tolerance level. This may increase continuity/smoothness of the rotated audio signals, and in particular the first rotated audio signal (if it is a dominating signal with respect to energy/entropy). This may improve monophonic playback performance based on one of the rotated audio signals, e.g. the first rotated audio signal.

The adaptive rotation stage may be adapted to apply this constraint to the adaptive energy compacting orthogonal transformation. Alternatively, the spatial analyzer may be adapted to apply the constraint indirectly, by applying a constraint to the decomposition parameters which determine the quantitative properties of the adaptive energy compacting orthogonal transformation.

In some example embodiments, a time resolution of the decomposition parameters is relatively higher than a time resolution of the spatial parameters (i.e. the frequency by which the decomposition parameters are updated, or the speed by which they may be allowed to change, is higher than the corresponding frequency/speed for the spatial parameters). For example, the signals in the plurality of audio signals may be divided into time frames. The decomposition parameters may be determined to make coding of the rotated audio signals efficient and may therefore be updated often. For example, a new set of decomposition parameters may be determined for each individual time frame, or for sets of a number of consecutive time frames. The spatial parameters, on the other hand, may be determined primarily to enable synthesis of a sound field representation from a mono audio signal. In such a synthesis, rapid changes in the spatial parameters may cause undesirable effects in the generated sound field. Hence, the spatial parameters may be determined to reflect longer term properties/changes of the plurality of audio signals W, X, Y, and may be updated less often than the decomposition parameters (which also need to take into account coding efficiency, as described above), or changes in the spatial parameters may be restricted to preserve sound quality.

In some example embodiments, the analysis stage is adapted to perform an auditory scene analysis based on the plurality of audio signals, and to output the spatial parameters based on the auditory scene analysis. The analysis stage may be configured to locate directions of sound sources and/or determine relatively longer-term properties of the plurality of audio signals, compared to for example the length of a time frame. For example, the auditory scene analysis may involve analyzing and/or building up over time a map of objects within the audio scene described by the plurality of audio signals. Such analysis may involve physical and perceptual elements and historical learning that extends well beyond that which would be employed to determine the decomposition parameters. For example, for a point of time when multiple sound sources are simultaneously active in received sound, it may be difficult to resolve incident directions. Given the history of the received audio up to that point in time, the auditory scene analysis may be able to handle such a situation more appropriately, letting the spatial parameters reflect a plausible configuration and activation of sound sources. In another example, relative strengths of direct and a reverberant (or reflected) component incident to a microphone from a particular source, may be estimated over a (longer) time period of source activity. Such information may be useful to derive spatial parameters giving a sense of distance to the source, or reflective characteristics of the room involved. Such parameters may not be needed when determining the decomposition parameters, where the goal is to efficiently represent the audio signals. However with appropriate estimation, such parameters may be useful in e.g. spatial synthesis. As these examples suggest, the spatial parameters may capture results of analysis and processing that is performed at the point of audio input, such that it may be used during playback (or mixing of signals at a server), eliminating the need of extracting them again at the output endpoints (or server) from the full spatial signal WXY. This allows for different operations and decisions to be made downstream without undue computational complexity.

In some example embodiments, the spatial analyzer is adapted to estimate covariances of the plurality of audio signals. The covariances may be used to determine energy/entropy content of the plurality of audio signals, and/or to form a covariance matrix of the plurality of audio signals. The covariance matrix may be used to determine how to perform a suitable (e.g. resulting in efficient coding of the resulting rotated audio signals) orthogonal transformation, by which the plurality of audio signals is decomposed. For example, eigenvectors of the covariance matrix may be computed (or estimated, e.g. by iterative procedures), and the decomposition parameters may be determined to encode a decomposition matrix performing projections on the eigenvectors of the covariance matrix.

In some example embodiments, the eigenvalues of the eigenvectors may be calculated, and the eigenvectors arranged by order of decreasing eigenvalues or absolute values of eigenvalues. The first rotated audio signal may then correspond to a projection of the plurality of audio signals on the eigenvector having the largest associated eigenvalue or largest absolute value thereof.

In some example embodiments, the spatial analyzer is adapted to perform temporal smoothing of successive framewise covariance values. In such embodiments, the covariance values used to determine the decomposition parameters in a given time frame may be mean values of covariances from a number of consecutive time frames, or values calculated based on covariance values for several time frames. Hence, the determined decomposition parameters may change less rapidly. An effect of this is that (the decomposition parameters, and thereby) the plurality of rotated audio signals, and the first rotated audio signal in particular, may be more suitable for obtaining mono playback (with a good listening experience), optionally using the gain profile g, and/or for spatial synthesis using the spatial parameters Th. The coding efficiency achieved by the adaptive orthogonal transformation may be improved by rapid updates/changes of the decomposition parameters (i.e. little or none temporal smoothing). For instance, the updates may be frame-wise. On the other hand, because physical audio sources typically move on a slower time scale, the perceptual quality of the mono and spatial audio obtainable from the first rotated audio signal E1 may be increased by temporal smoothing of the decomposition parameters (or covariances used to compute them). The amount of temporal smoothing may therefore be chosen to get a suitable trade-off between coding efficiency and perceptual mono/spatial audio quality.

In some example embodiments, the audio encoding system further comprises a time-invariant pre-conditioning stage. The pre-conditioning stage may be configured to output the plurality of audio signals W, X, Y based on an equal number of input audio signals L, R, S. For example, the audio input signals may be obtainable by three angularly distributed directive transducers.

In some example embodiments, the audio encoding system further comprises a multiplexer. The multiplexer may be configured to multiplex the decomposition parameters, the plurality of rotated audio signals and the gain profile (or encoded versions of all these different signals) into one bitstream B. Optionally, the multiplexer may multiplex also the spatial parameters into the bitstream. The bitstream may be used for distribution purposes, including transmission or storage. It is to be noted that the specific nature of the coding of the information contained in these multiplexed signals and parameters is not the focus of this disclosure. In some embodiments, techniques well known in the art may be used to encode the signals and/or parameters. For example, frequency domain perceptual coding may be used for the audio signals, and quantized level, differential and/or entropy coding may be used for the gain profile and other parameters.

In some example embodiments, the audio encoding system comprises a multiplexer adapted to output a multilayered signal (or spatially layered signal), from which different signal layers may be extracted. The multilayered signal may for example be encoded in a bitstream or a plurality of bitstreams. The multilayered signal may comprise a monophonic layer (or mono layer) comprising the first rotated audio signal and the time-variable gain profile. The monophonic layer may be extractable from the multilayered signal as e.g. one bitstream comprising the first rotated signal and another bitstream comprising the gain profile, or alternatively as one bitstream comprising them both.

Optionally, the multi-layered signal may comprise a first sound field layer (or spatial synthesis layer) which partially overlaps the monophonic layer, comprising the first rotated audio signal, the gain profile and the spatial parameters. The first sound field layer may be extractable from the multilayered signal, e.g. as three bitstreams comprising the first rotated signal and the gain profile and the spatial parameters respectively, but the spatial parameters may alternatively be extractable encoded separately in different bitstreams.

Additionally, or alternatively, the multi-layered signal comprises a second sound field layer (discretely decodable sound field layer), partially overlapping the monophonic layer (and the first sound field layer), comprising the plurality of rotated audio signals, the gain profile and the decomposition parameters. The second sound field layer may be extractable from the multilayered signal, e.g. as a bitstream comprising the first rotated signal, a bitstream comprising the decomposition parameters and bitstreams comprising the remaining rotated audio signals encoded separately. Alternatively, the remaining rotated audio signals (and possibly also the decomposition parameters) may be encoded together in a common bitstream.

An effect of the multilayered format is that the different layers, representing different audio formats such as mono, spatial, and sound field format, are easily accessible by units receiving the bitstream B which is output by the multiplexer.

In some example embodiments, the audio encoding system is operable to suspend output of some signals in order to tailor the output to needs of certain receiving units. For example, if the audio encoding system is to supply input to a number of receiving nodes equipped with single-channel speakers, only a mono signal may be needed. Hence, the audio encoding system may be operable to suspend output of the spatial parameters and the decomposition parameters, which may not be needed. Moreover, among the plurality of rotated audio signals, only the first rotated audio signal may be needed (possibly together with the gain profile g) to acquire a mono audio representation in the receiving unit. Hence, the audio encoding system may also be operable to suspend output of the remaining rotated audio signals. Output of signals may be suspended by suspending output of the different signals from the spatial analyzer, the adaptive rotation stage and the analysis stage respectively. Additionally or alternatively, the audio encoding system may be operable to suspend output of some signals by encoding (multiplexing and/or packing) only the needed signals in a bitstream B, and supplying the bitstream as output of the system. As used herein, suspending output of a component/unit may include omitting it from the output of the system; alternatively, suspending output of the component may include interrupting its production altogether.

The audio encoding system may be adapted to suspend output of some signals in order to only supply output needed by receiving units to perform spatial synthesis (required output may be the gain profile, the first rotated audio signal and the spatial parameters), Hence, the audio encoding system may be operable to suspend output of the decomposition parameters and all but the first rotated audio signal of the plurality of rotated audio signals.

The audio encoding system may be adapted to suspend output of some signals in order to only supply output needed by receiving units to perform discrete decoding of the plurality of audio signals into a sound field representation. Hence, the audio encoding system may be adapted to suspend output of the spatial parameters in order to output only the gain profile, the plurality of rotated audio signals and the decomposition parameters.

In some applications, the gain profile may not be needed. For such applications, the audio encoding system (of any of the preceding embodiments) may be adapted to suspend output of the cleaning gain.

In some example embodiments, the spatial analyzer is configured to quantize the decomposition parameters before outputting them (and supplying them to the adaptive rotation stage). This way, the quantitative properties of the adaptive orthogonal transformation may be determined by the quantized versions of the decomposition parameters, and a decoder may reconstruct the plurality of audio signals W, X, Y from the plurality of rotated audio signals E1, E2, E3 using the quantized versions of the decomposition parameters. Because the orthogonal transformation on the encoder side will correspond closely to the inverse of the same orthogonal transformation on the decoder side (i.e., both are determined by quantized decomposition parameters, so that no rounding error is introduced), the accuracy in the reconstruction of the plurality of audio signals W, X, Y is improved.

Further provided is an audio encoding method analogous to any of the above embodiments of audio encoding systems. It may comprise determining the decomposition parameters; decomposing the plurality of audio signals into the plurality of rotated audio signals based on the orthogonal transformation determined by the decomposition parameters; determining the time-variable gain profile (and optionally the spatial parameters); and outputting the decomposition parameters, the plurality of rotated audio signals and the time-variable gain profile (and optionally the spatial parameters).

An example embodiment provides a sound field audio decoding system for providing a sound field representation of a plurality of audio signals W, X, Y. The decoding is based on a plurality of rotated audio signals E1, E2, E3, a time-variable gain profile g and decomposition parameters K. As described in the preceding embodiments, the rotated audio signals are obtainable from the plurality of audio signals using an adaptive energy-compacting orthogonal transformation. As described in the preceding embodiments, the time-variable gain profile comprises at least one frequency-variable component which when applied to at least one of the plurality of rotated audio signals, or at least one signal derived therefrom, attenuates non-voice content. The sound field audio decoding system comprises a cleaning stage and an adaptive rotation inversion stage.

The cleaning stage is adapted to receive the time-variable gain profile and the plurality of rotated audio signals and to obtain and output a plurality of modified rotated audio signals E1', E2', E3' by applying (the whole or part of) the time-variable gain profile to the plurality of rotated audio signals. As described in the preceding embodiments, the gain profile may be applied as a whole, or certain components (such as mono, spatial, noise, reverb, sibilance, level or voice activity gain components) of the gain profile may be applied. The gain profile may be applied to the same amount (i.e. in the same way) to each of the rotated audio signals. In other words, when applying the gain profile, no distinction may be necessary between the rotated audio signals.

The adaptive rotation inversion stage is configured to discretely decode the plurality of modified rotated audio signals into the sound field representation based on the decomposition parameters. It is to be noted that the application of the gain profile before the discrete decoding, does not substantially affect the accuracy of the discrete decoding. In particular, the discrete decoding may be a linear operation, whereby it does not matter for the resulting sound field representation whether the gain profile is applied before or after decoding. For framed audio systems with some form of overlapping, such as frequency domain transforms or subbands that are common for embodiments of this disclosure, the gain profile may be applied either before or after the discrete decoding, i.e., either to the plurality of rotated audio signals E1, E2,E3 as they are decoded or to the resulting sound field channels. For implementation efficiency, the application of the gain profile may preferably be combined with the mantissa generation stage of the decoding of the rotated audio signals.

As described in the preceding embodiments, the time-variable gain profile may comprise different gains to be applied to different frequency bands of the rotated audio signals. Additionally, or alternatively, the time-variable gain profile may comprise a gain to be applied to all frequency bands, in a desired frequency range, of the rotated audio signals, while the remaining frequencies of the rotated audio signals may be attenuated, removed or disregarded. The rotated audio signals may be received divided into time segments, and the time-variable gain profile may comprise a gain profile for each of these time frames. The gain profiles associated with the different time frames may typically be different, but may be similar, or even identical, for adjacent time frames or for a number of consecutive time frames.

The sound field audio decoding system may receive the plurality of rotated audio signals, the time-variable gain profile and the decomposition parameters. It may receive at least one (e.g., all) of these signals indirectly, and/or as parts of (or encoded in) other signals.

In some example embodiments, the sound field audio decoding system may comprise a demultiplexer configured to receive a bitstream B, preferably a single bitstream. The demultiplexer may be configured to obtain (possibly encoded versions of) the plurality of rotated audio signals, the time-variable gain profile and the decomposition parameters from the (single) bitstream. In some example embodiments, the bitstream B is a single bitstream comprising (the vector of) decomposition parameters K, the gain profile, spatial parameters Th and the plurality of rotated audio signals E1, E2, E3. The sound field audio decoding system may comprise decoders adapted to decode signals supplied by the demultiplexer. For example, there may be one decoder to decode an encoded version of the first rotated audio signal, one decoder to decode an encoded version of the remaining rotated audio signals (or one decoder each for these signals as well), one decoder for decoding a encoded version of the time-variable gain profile and one decoder for decoding an encoded version of the decomposition parameters.

In some example embodiments, the sound field audio decoding system comprises a downscaling section allowing control of the extent to which the gain profile (or its components) is to be applied. Put differently, the gain profile may comprise an instruction for obtaining a cleaned or functionally processed audio signal representation on the basis of one or more audio signals (e.g. the first rotated signal or the plurality of rotated audio signals). The gain profile g may for instance specify that a particular frequency subband of the audio signal (or audio signals) is to be attenuated by 5 dB. An alternative mono audio signal representation is obtained if the frequency band is instead attenuated by, say, 4 dB ($\alpha$=80% of the specified value). For example, the attenuation amounts for all subbands may be downscaled by $\alpha$=80% in order to obtain an alternative audio signal representation.

Additionally, or alternatively, the downscaling section may apply a plurality of different downscaling factors to different functional components of the gain profile. For example, a cleaning gain (e.g. noise, sibilance and/or reverb) may be downscaled by one factor, while another gain component (e.g. another cleaning gain component or a voice activity gain) may be downscaled by another factor.

The value of downscaling parameter (or parameters) controlling the downscaling section may e.g. be determined by an output endpoint (adapted to generate sound output) or a server (adapted to mix/combine different audio signals) in which the decoding system is located (or to which it is associated), whereby the endpoint (or server) may specify whether only light processing, more thorough processing or full processing of different types (as specified by the gain profile g and its different components such as e.g. cleaning of voice activity gains) is to be applied to obtain a modified audio signal. For example, in the case in combination of sound fields, it may be preferable to 'clean'' input audio which are less important (or active) in the conference in order to reduce the impact of accumulating noise.

The value of downscaling parameter (or parameters) may alternatively be preset during the design of an endpoint device or server, in which the audio decoding system is deployed. This aspect of the proposed embodiments may be used to preserve processing resources and facilitate differing use of a given encoded complete signal by downstream users, endpoints, servers or other processing systems. At the point of extraction, a processing block can adapt the processing applied to the extracted signal to match the playback equipment in the endpoint device, etc. This application of variable processing is achieved without significant computational effort using only the proposed data in the layered coding approach.

Further provided is a sound field audio decoding method analogous to the preceding embodiments of sound field audio decoding systems. The method may comprise obtaining the plurality of modified rotated audio signals based on the time-variable gain profile and the plurality of rotated audio signals, and subsequently discretely decoding the plurality of modified rotated audio signals into the sound field representation based on the decomposition parameters.

An example embodiment provides an audio transmission network comprising at least one audio encoding system according to any of the preceding embodiments of audio encoding systems. The audio encoding network further comprises at least one decoding system communicatively connected to the at least one audio encoding system. The audio decoding systems may be of any of the types:

a) a mono audio decoding system adapted to obtain a mono audio signal representation of the plurality of audio signals based on output of one or more of the at least one audio decoding systems. Optionally, the mono audio decoding system may comprise a cleaning stage adapted to obtain the mono audio signal representation by applying (at least part of) the time-variable gain profile to the first rotated audio signal;

b) a spatial audio decoding system comprising a spatial synthesis stage adapted to synthesize a sound field representation of the plurality of audio signals by performing spatial synthesis based on the first rotated audio signal and the spatial parameters. Optionally, the spatial audio decoding system may comprise a cleaning stage adapted to apply (at least part of) the time-variable cleaning gain to the first rotated audio signal and to supply a cleaned version of the first rotated audio signal to the spatial synthesis stage; and c) a sound field audio decoding system according to any of the preceding embodiments of sound field decoding systems. Or alternatively, a sound field audio decoding system similar to any of the preceding embodiments, but wherein the adaptive rotation inversion stage is configured to discretely decode the plurality of rotated audio signals into a temporary sound field representation, and wherein the cleaning stage may be adapted to apply the time-variable cleaning gain to the temporary sound field representation to obtain the sound field representation.

In some example embodiments, the audio transmission network comprises at least one decoding system of at least two of the types a), b) and c), or at least one decoding system of each of the three types a), b) and c). In such embodiments, the audio encoding system may supply audio signals to audio decoding systems of different types, simultaneously. If the output of the audio encoding system comprises the decomposition parameters, the plurality of rotated audio signals, the time-variable gain profile and the spatial parameters, the different types of decoders may obtain their respective audio format from the common output of the audio encoding system.

In some example embodiments, the transmission network may further comprise a mono audio encoder, for providing a mono audio signal (i.e. a single channel audio signal) and an associated gain profile. The mono audio encoder may comprise an analysis stage adapted to determine the gain profile based on mono audio input. The mono audio encoder may be communicatively connected to at least some of the other units of the network, and may output (an encoded version of) the mono audio input, and the determined gain profile.

Further provided is an audio transmission method analogous to any of the preceding embodiments of audio transmission networks. The audio transmission method may comprise at least one audio encoding method according to any of the preceding embodiments of audio encoding methods and at least one audio decoding method of any of the types:
- a mono audio decoding method comprising obtaining a mono audio signal representation based on output of one or more of the at least one audio encoding methods (optionally comprising applying the gain profile to the first rotated audio signal),
- a spatial audio decoding method comprising synthesizing a sound field representation based on the first rotated audio signal and the spatial parameters (optionally also comprising applying the gain profile to the first rotated audio signal prior to synthesizing), and
- a sound field audio decoding method according to any of the preceding embodiments of sound field decoding methods.

An example embodiment provides a computer program product comprising a computer-readable medium with instructions for causing a computer to execute an audio encoding, decoding or transmission method with the features discussed above.

It is to be noted that any of the embodiments of the above described embodiments of encoders, decoders, encoding methods and decoding methods may be employed as parts of a mixer or mixing method (e.g. in a server in a teleconferencing system) for decoding a plurality of audio signals received in the above described layered format, forming a combined signal and encoding the combined signal in the layered format. Examples of such mixers are described in the following section.

b. Gain Profile

An example embodiment provides an audio encoding system for producing a gain profile g based on an audio signal. The gain profile comprises a voice activity gain $G_{VAD}$ and a cleaning gain $G_{clean}$, and is adapted to be distributed (e.g. stored or transmitted together) with the audio signal. The audio encoding system comprises a voice activity detector and a noise estimator. The audio signal may be e.g. a single-channel audio signal or a multichannel audio signal. The audio signal may e.g. be a mono signal representation or a multi-signal (i.e. multichannel) representation of a sound field.

The voice activity detector is adapted to determine the voice activity gain by (at least) determining voice activity in the audio signal. The voice activity gain may be time-variable, i.e., the voice activity gain may be assigned different values for different time periods (or time instants, or time frames if the signal is segmented into time frames). However, in some example embodiments, voice activity in the audio signal may be such that the determined voice activity gain is constant for a period of time. The voice activity gain may be determined based on momentary voice activity, i.e. a value of the voice activity gain associated with a time period (or time frame, if the audio signal is segmented into time frames) may be based on voice activity in (or close to) that time period (or time frame). Alternatively, a value of the voice activity gain associated with a time period may be determined at least partly based on voice activity in the past (e.g. based on recent time frames). The voice activity gain may e.g. be adapted to achieve phrasing (by e.g. binary gating) and/or fade out at the end (fade in at the beginning) of time periods of voice activity in the audio signal.

The noise estimator is adapted to determine the cleaning gain by (at least) estimating noise (or non-voice content and/or distortions such as sibilance and/or reverb) in the audio signal, i.e., estimating undesired content of the audio signal, such as non-voice content. The cleaning gain is frequency-variable, i.e., it comprises a collection of values to be applied to different frequency components (or frequency bands). The values of the cleaning gain to be applied to different components (or frequency sub-bands) are typically different. However, in some example embodiments the audio signal may be such that the determined cleaning gain is constant with respect to frequency for at least some time instants (time frames). The cleaning gain may be time-variable, i.e., the cleaning gain may be assigned different values for different time periods (or time instants, or time frames). However, in some example embodiments, the noise in the audio signal may be such that the determined cleaning gain is constant for a period of time. The cleaning gain may be adapted to suppress ambient noise or undesirable audio components to achieve a cleaned or reduced spatial fidelity representation of the captured audio. The noise estimator may be adapted to identify certain frequencies of the audio signal as corresponding to the desired voice, and to assign a cleaning gain suppressing/attenuating other frequencies in order to clean the audio signal. For instance, the cleaning gain may comprise one or more notches to remove noise components around the desired voice. It is to be noted that in at least some example embodiments, it is acceptable to apply the cleaning gain to frequency domain coefficients of an audio signal even if the audio signal is critically sampled. A reason for this is that distortion from violating time-domain aliasing cancellation (TDAC) is typically well masked in voice, and is typically only rapidly time-varying when the signal is noisy.

Still referring to the same example embodiment, the cleaning gain, in the gain profile, is separable from the voice activity gain, i.e., the cleaning gain is obtainable from the gain profile independently of the voice activity gain. Similarly, the voice activity gain is separable from the cleaning gain, i.e., is obtainable from the gain profile independently of the cleaning gain. Hence, the cleaning gain and the voice activity gain may be applied independently to the audio signal in e.g. a decoder, in order to achieve an audio signal with improved (or more desirable) properties for e.g. a certain playback mode or for combination with other audio signals. In a mixer, the cleaning gain and the voice activity gain may be separated in order to undergo different types of processing and then packed into one or more gain profiles.

Because the voice activity gain and the cleaning gain are encoded separately from the audio signal, mixing may proceed without restoring the original audio signals, so that audio signals and gains are combined in independent sections of a mixer. Because further the two gain types are encoded in a separable manner, there is an option of providing these by different algorithms in the mixer.

It is to be noted that the voice activity gain is an example of a time-variable first gain comprised in the gain profile, and the voice activity analyzer is an example of a first audio analyzer adapted to determine the first gain based on the audio signal. Further, the cleaning gain is an example of a time-variable and frequency-variable second gain, and the noise estimator is an example of a second audio analyzer adapted to determine the second gain based on the audio signal, wherein the first gain is encoded separable from the second gain in the gain profile. The advantages outlined in the preceding paragraph are obtained regardless of the precise nature (or naming) of the first and second gains as long as they are encoded in the gain profile such that they are separable. Indeed, the first gain may be a level gain (described below), and the first audio analyzer may be a loudness analyzer (described below). The first gain may as well be a frequency-variable gain, such as a sibilance gain or a reverb gain (both described below). The second gain may be a reverb gain (and the first gain may be a different frequency-variable gain such as a sibilance gain).

In some example embodiments, the gain profile (or the cleaning gain) may be determined based on analysis of the audio signal, including statistical analysis across time and/or frequency. In examples where the audio signal is a multi-channel signal, spatial aspects of the audio signal may also be used to determine the gain profile (or the cleaning gain). Because the gain profile is separate from the audio signal, however, mixing may proceed without analyzing the audio signal.

The voice activity gain and the cleaning gain may be mutually independent, i.e. they may be determined independently of each other and their respective values may not be related.

The voice activity gain may be a broadband gain, i.e., it may be constant with respect to frequency (at least in the operational frequency range of the audio encoding system). For example, the voice activity gain and may be represented, at a given point in time (in a given time frame), by a constant number.

The voice activity gain may be of a binary type assuming either a fixed "high" or a fixed "low" value. Alternatively, the "high" value may be selectable from a range, wherein segments with a positive detected voice activity may have individual voice activity gain values. This enables adjustments of the loudness level, e.g., in order to make it more consistent over time.

In some example embodiments, the voice activity gain may vary within a segment effecting a smoother transition in and out of an otherwise silent or low level signal state that may be present as output of decoding, should the signal transmission be adapted to be discontinuous (i.e. absent during periods flagged as having no voice activity). Variation of the voice activity gain across a segment may be applied to effect a fast but smooth onset, and a slower fade out as the voice activity is completing or falling below some suitable activity threshold.

In some example embodiments, the audio signals may be represented at some point in the form of transform or subband coefficients, and at least one of the voice activity gain, the noise gain may be structured to represent a profile of real gain coefficients to be applied across such a set of subbands (for the voice activity gain, the gain coefficient may have the same value for all subbands). The encoded gains can be thought of as representing a set of gains to be applied to different frequency subbands. They may be encoded on a linear or logarithmic scale, as deemed suitable. In some example embodiments, the gains may be encoded using a Huffman approach. The gains may be quantized with respect to dB and with different resolution for different dB ranges.

In some example embodiments, the gain profile further comprises a time-variable level gain $G_{level}$, and the audio encoding system further comprises a loudness analyzer. The loudness analyzer is adapted to determine the level gain by (at least) determining loudness of a component of interest (or a desired voice) in the audio signal. The determined loudness may be a momentary loudness. The component of interest may change over time, i.e., the determined loudness may refer to different components of interest for different points in time. Loudness may be estimated based on characteristics of the dynamic range of the audio signal (audio signal channels), the signal power, perceptually weighted signal power or the like. The level gain may e.g. be adapted to achieve a consistent loudness in the audio signal over time. In the gain profile, the level gain is separable from the voice activity gain and the cleaning gain, i.e. the level gain is obtainable from the gain profile independently.

The voice activity gain and the level gain may be mutually independent, i.e., they may be determined independently of each other and their respective values may not be related. Similarly, the cleaning gain and the level gain may be mutually independent.

In some example embodiments, the cleaning gain is encoded using notches (in a frequency profile of the cleaning gain) for removing noise components at certain frequencies located at the notches. The notches may be encoded by differentially encoding the positions of the notches, and encoding the height of the notches with respect to dB. The level gain may be interpolated (e.g., linearly of nonlinearly) between the notches. To achieve better sound/voice quality (and/or to reduce spectral tearing), the level gain may preferably be constrained from varying, as a function of frequency, more rapidly than at a certain rate. To limit the variation of the level gain with respect to frequency, the frequency profile of the level gain may be regularized based on psychoacoustic and/or psychophysical energy masking curves. Given the functional nature of the cleaning gain, to create an emphasis on the desired signal components without undue modulation and distortion artifacts, the cleaning gain may have a perceptual characteristic or regularization that restricts it from being completely independent across frequency.

In some example embodiments, wherein the audio signal is segmented into time frames, the gain profile (including some or all of the level gain and the cleaning gain, and optionally the voice activity gain in embodiments where it is included) is encoded on a per time frame basis in such a way that the encoding of the gain profile in a time frame is independent of (the encoding the gain profile in) previous time frames. For example, the voice activity detector, the noise estimator, and (in embodiments where it is included) the loudness analyzer may be adapted to encode its respective gain on a per time frame basis as described above. As an effect of the gain profile being encoded on a per frame basis, the encoding is stateless, and each encoded time frame may be processed independently of other time frames (by receiving units). This makes the gain profile less sensitive to occasional packet losses in a use case where the gain profile is transmitted over a packet-switched network.

In some example embodiments, at least one of the voice activity detector and the signal level analyzer (or at least one of the voice activity detector, the signal level analyzer and the noise estimator, if a noise estimator is included in the system) is adapted to encode its respective determined gain on a per time frame basis, the encoding of a time frame being independent of previous time frames.

In some example embodiments, the noise estimator is adapted to determine at least two components of the cleaning gain based on the audio signal, and these components are adapted for use in different playback channel configuration. For example, the noise estimator may be adapted to determine a mono audio component adapted for use in mono audio playback such as in a subscriber's station in a conventional PSTN (i.e., single-channel audio), and to determine a spatial audio component adapted for use in spatial playback, such as in headphones or in a multi-speaker system (i.e., multi-channel audio). The use of different components of the cleaning gain for different playback modes (or playback channel configurations) allows for specialization of the different components to meet specific (and potentially conflicting) requirements of different playback modes.

In some example embodiments, the noise estimator is adapted to determine a plurality of components of the cleaning gain based on the audio signal. The plurality of components may comprise at least one of (and preferably all of) a reverb gain adapted to attenuate room acoustics content (in a single-channel or multi-channel audio signal), and a sibilance gain adapted to attenuate sibilance content (in a single-channel or multi-channel audio signal). A separate reverb gain allows for choosing if (and to which extent) to attenuate room acoustics audio components during playback. Such a choice may depend on the playback mode (or the playback channel configuration) but also on e.g. acoustic properties of the playback environment. The reverb gain may be derived (from the audio signal in which it is to attenuate reverb content) using standard algorithms for reverb attenuation of audio signals, known to persons skilled in the art. Similarly, a separate sibilance gain allows for choosing if (and to which extent) to attenuate sibilance audio components during playback. In particular, a close microphone voice may have undesirable dynamics, especially at high frequencies in mono playback. The sibilance gain may be used to attenuate content originating from such undesirable dynamics, including intrusive capture of sibilant phonemes such as [s] and [z]. The sibilance gain may be derived (from the audio signal in which it is to attenuate sibilance content) using standard algorithms for sibilance attenuation of audio signals, known to persons skilled in the art.

Additionally, or alternatively, the plurality of components, of the cleaning gain, may comprise a noise gain $G_{noise}$ adapted to attenuate non-voice content, or noise other than sibilance content and reverb content (in a single-channel or multi-channel audio signal). This allows for choosing if (and to which extent) to attenuate non-voice audio components during playback. The noise gain may be derived (from the audio signal in which it is to attenuate non-voice content) using standard algorithms for attenuation of non-voice content of audio signals, known to persons skilled in the art. In the case of an endpoint having multiple microphone inputs, the noise or cleaning gain may be adapted to have a component (of suppression/attenuation) related to spatial aspects of the incident signal, which may be formed from the estimated target or desired signal and instantaneous spatial parameters across the input channels at any instant in time. Such a spatial suppression gain may provide a broadband or frequency-variable contribution to the noise and/or cleaning gain.

The use of separate gain components for attenuation related to different aspects (e.g. reverb and sibilance and noise) gives more freedom (than e.g. a fixed set of gain components for use in different playback modes) and allows for choosing a tailored attenuation at a receiving unit. The efficient coding of the gain profile seeks to preserve as much information as possible in a compact way to facilitate the wider possibility of control and use of the represented audio signal downstream. This is of particular use in a teleconferencing environment where the degree of leveling, suppression and cleaning can vary based on dynamic conference and listening conditions not known at the time of first processing and encoding the audio (e.g., in a capturing endpoint).

In some example embodiments, the cleaning gain may comprise the following components: a reverb gain, a sibilance gain and a noise gain, as described above.

In some example embodiments, the gain profile may comprise a nuisance component adapted to attenuate audio signals from endpoints identified as a nuisance. For example, where a non-nuisance object may be speech uttered by a voice conference participant, the nuisance may be typing or other background noise present during the voice conference along with speech uttered by conference participants. The use of a separate nuisance component allows for attenuation of undesirable audio signals downstream at a server, or by a client based on the importance of the associated endpoint in a present rendering scene. This may be more desirable than performing the attenuation (in a similar fashion) further upstream, closer to the audio signal source, where however less may be known about the present rendering scene at the output end.

In some example embodiments, the noise estimator is adapted to receive information, from the voice activity detector, regarding voice activity in the audio signal, and to determine the cleaning gain based on this information. For example, the noise estimator may base the determined cleaning gain on templates corresponding to different voice activity states. The voice activity detector may e.g. inform the noise estimator whether the audio signal is currently in a voice segment or in a noise only section, and the noise estimator may determine the cleaning gain based on a voice template or a noise only template. The noise only template may be relatively less varying (with respect to frequency) and spectrally flat, while the voice template may be relatively more varying (with respect to frequency) to remove noise content around a desired voice.

In some example embodiments, the voice activity detector is adapted to encode the voice activity gain using at least one predefined gain. For a transition from a voice segment to a noise only section in the audio signal, the determined voice activity gain may start at a relatively high predefined gain value and decrease gradually over time to a relatively low gain value. Such a gradual decrease (or fade-out) may be represented by a time sequence of predefined gains. In the voice activity gain, a predefined time sequence of gains may be represented by a coding index. Similarly, a fade-in sequence may be achieved by a different sequence of predefined gains, represented by a coding index. Encoding of the voice activity gain using predefined sequences of gains (and indices referring to these) allows for more efficient coding than encoding by using the gain values themselves at full precision.

Additionally or alternatively, the voice activity detector may be adapted to encode the voice activity gain by indicating starting points of predefined time sequences of gains (or of transitions which may be represented by predefined time sequences of gains). An indicated starting point may imply that the rest of the predefined time sequence of gains is to follow, and hence, the rest of the predefined time sequence of gains may not need to be encoded. Hence, in some time frames, no coding bits may be required to encode the voice activity gain. To obtain the voice activity gain from such an encoding, a receiving unit may comprise a counter measuring time elapsed after the start of the most recent transition between voice segments and noise only sections. Using the measured time, an appropriate value of the voice activity gain may be selected from the predefined time-sequence of gains. Alternatively, a receiving unit may comprise a memory adapted to store received coding bits during transitions to keep track of a correct position in a predefined time sequence of gains. It is to be noted that this embodiment achieves coding efficiency but may be more exposed to packed loss. This may be mitigated by repeating a coding index of an ongoing fade-in/fade-out sequence in every time frame throughout its duration. Because the total number of states needing to be identified by coding indices is still reduced, there is a saving in bandwidth or storage space.

In some example embodiments, at least some of the determined gains (and preferably all) are encoded separately (individually) in the gain profile, i.e. their respective encodings are independent and the different determined gains may be obtained independently from the gain profile. Optionally, at least some of the determined gains (and preferably all) are encoded using independently selected encoding techniques/methods. For example, the different determined gains may be encoded using different precisions and/or using different predefined time sequences of gains as described above, and/or using different quantizers (quantization levels and quantization indices associated therewith). This allows for use of encoding techniques tailored for the different determined gains.

In some example embodiments, the audio encoding system further comprises a multiplexer adapted to encode (and/or output) the determined gains (i.e. the voice activity gain, the cleaning gain and, in embodiments where it is included in the gain profile, also the level gain) and the audio signal in one bitstream. The determined gains may be (separately) obtainable from the bitstream.

Further provided is an audio encoding method analogous to any of the preceding example embodiments of audio encoding systems. It may comprise determining voice activity in the audio signal and assigning a value to the voice activity gain based the determined voice activity. It may further comprise estimating noise in the audio signal and assigning a value to the cleaning gain based on the estimated noise. More precisely, this may entail assigning a vector of gain values for different frequencies since the cleaning gain is frequency variable.

Optionally, the gain profile may further comprise a level gain $G_{level}$ and the audio encoding method may further comprise determining loudness (of a component of interest) in the audio signal, and assigning a value to the level gain based on the determined loudness.

An example embodiment provides a mixing system for combining a plurality of received pairs of an audio signal and an associated gain profile. Each of the gain profiles comprises a time-variable voice activity gain $G_{VAD}$ and a time-variable and frequency-variable cleaning gain $G_{clean}$ (depending on how the gain profile is encoded, the voice activity gain and/or the level gain may not be represented explicitly in the gain profile at all time instants or time frames, but may be implicitly defined, e.g. by encodings in other time frames). The mixing system comprises a decoder, a gain combining stage and a mixing stage.

The decoder is adapted to derive, from each of the gain profiles (in the received pairs), a representation of the audio signal, the voice activity gain and the cleaning gain. The decoder may be monolithic or may comprise a set of decoders, each deriving one of the audio signal representation, the voice activity gain and the cleaning gain from one of the received pairs. As described in previous example embodiments, the voice activity gain and the cleaning gain are encoded as mutually separable components of the gain profile. Furthermore, the audio signal need not be reconstructed to a format suitable for playback, particularly not if the audio signal representation is one which permits additive mixing in encoded form.

The gain combining stage is adapted to determine a combined voice activity gain by combining the derived voice activity gains (i.e., combining the voice activity gains from the different received pairs) according to a first combining rule, and to determine a combined cleaning gain by combining the derived cleaning gains (i.e., combining the level gains from the different received pairs). The first combining rule is different from the second combining rule. The combining stage may comprise two separate combining stages, one combining the cleaning gains and one combining the voice activity gains.

Still referring to the same example embodiment, the mixing stage is adapted to combine one or more of the derived audio signals (of the received pairs) into a combined audio signal to be distributed with (a combined gain profile comprising) the combined voice activity gain and the combined cleaning gain.

In some example embodiments, the mixing stage may combine all of the audio signals into the combined audio signal. In some embodiments, the mixing stage may receive information about some of the audio signals indicating that they are not to be included when forming the combined audio signal. Such information may e.g. relate to voice activity, loudness or ambient noise of the audio signals. The information may e.g. be obtained from the decoding stage, and/or be based on the derived voice activity and level gains.

It is noted in the literature and prior art that the calculation of suppressive gain coefficients has many suggested approaches and formulae. It could be argued that there is no one ultimate correct gain, and approaches differ in optimization criteria of cost function, and in some cases perceived noise level and impact on the desired signal. As such, errors in these gain coefficients are generally not critical, and the coding and combination of gain profiles can take advantage of this permitted variability to achieve implementation efficiencies—both in coding and approximations of the combined and/or applied gains. As a rule, a critical aspect of any suppressive gain profile is how it varies over time and frequency at the point which it is applied. Techniques for filtering and regulating gains to achieve better perceptual outcomes are known in the art, and it is envisaged that such techniques or variations may be appropriately applied at the final stage of any chain just prior to application of the desired suppressive gains. It should be apparent to one skilled in the art that this observation and aspect of the invention is particular to the nature of the gain profiles and their function. It is qualitatively different to the nature of distortions that would ensue if a similar approximation approach or relaxation was applied to the audio signal representation itself. In this way, with the additional usage of the perceptual representation of frequency dependent gain profiles, it is noted that the data rate and application of the gain profiles can be achieved with fairly minimal overhead when compared to the data rate and complexity of the associated audio signal coding. Therefore, in practice, the invention realizes a substantial practical advantage in the layered approach to spatial and functional downstream signal processing with a low overhead.

In some example embodiments, the gain combining stage is adapted to determine the combined voice activity gain by assigning (for a given time frame or time period) a combined voice activity gain achieving an attenuating amount equal to the lowest attenuating amount of the derived voice activity gains (in the time frame or time period). For example, if combining two voice activity gains, one corresponding to a relatively higher attenuation of a noise only section, and the other corresponding to a relatively lower attenuation of a voice segment, the gain combining stage may assign a combined voice activity gain achieving a relatively lower attenuation of a combination of the voice segment and the noise only section. It is to be noted that an audio signal currently associated with a negative (or small) voice activity gain (i.e. a voice activity gain corresponding to an attenuation rather than a magnification, and which may indicate a noise only section) is not always to be excluded from the mixing, as this may be perceived as a discontinuity if the background/ambient noise temporarily disappears.

In an example embodiment, the gain combining stage is adapted to compute the combined voice activity gain by finding the maximum gain (i.e., the least attenuation amount) from among the derived voice activity gains. This is a possible formulation of the combining rule. An effect of this is that the combined voice activity gain will only be zero (suppressive) if all audio signals have been assigned a negative voice activity and are associated with zero voice activity gains.

In an example embodiment, the second combining rule (governing the combining of the cleaning gains) may stipulate that the combined cleaning gain is determined on a per subband basis. For each subband, the gain combining stage retrieves the minimum cleaning gain (i.e., highest attenuating amount in that subband) and adopts it as the combined cleaning gain value in that subband. This leads to a stronger attenuation of a particular noise component in one of the audio signals than if, say, the combined cleaning gain had been equal to the subband-wise average of all cleaning gains; as a consequence, the concerned noise component will be completely attenuated, to the benefit of the combined audio signal. In a further development of this example embodiment suitable for an implementation where level gains are present and subject to combining in the mixer, the derived cleaning gains may be rescaled by the respective derived level gains prior to the search for the minimum cleaning gain; this avoids asserting that level gain twice, and also achieves a fair balance between the cleaning gains insofar that they are compared on the final scale.

In an alternative example embodiment, the cleaning gains may instead be combined by averaging. In particular, the combined cleaning gain may be computed as a subband-wise weighted average. The weights may be the respective powers of the audio signals, e.g., as measured by an absolute value of the transform coefficient associated with that frequency subband. Alternatively, the weights may be perceptually weighted powers of the audio signals. Furthermore, the cleaning gains may be averaged on a linear scale (waveform scale), as per $$G_{level,comb} = \frac{P_i G_{level,i}}{\sum P_i},$$

or on a quadratic scale (energy scale), as per $$G_{level,comb} = \sqrt{\frac{\sum P_i G_{level,i}^2}{\sum P_i}}.$$

Here, $P_i$ denotes the (perceived) signal power of the $i^{th}$ audio signal. It is understood that the two above equations are to be applied once per subband (rather than in a broadband fashion).

In an example embodiment, the cleaning gain may include a separately encoded sibilance component. In this situation, the gain combining stage in the mixing system may be adapted to retrieves the minimum sibilance gain (i.e., highest attenuating amount in that subband) and adopts it as the combined sibilance gain value in that subband. This lead to a stronger attenuation of a sibilant component in one of the audio signals than if, say, the combined sibilance gain had been equal to the subband-wise average of all sibilance gains; as a consequence, the concerned sibilant component will be more completely attenuated, to the benefit of the combined audio signal. In a further development of this example embodiment suitable for an implementation where level gains are present and subject to combining in the mixer, the derived sibilance gains may be rescaled by the respective derived level gains prior to the search for the minimum sibilance gain; this avoids asserting the concerned level gain twice, and also achieves a fair balance between the sibilance gains.

Additionally or alternatively, the gain combining stage is adapted to determine the combined level gain by assigning (for a given time frame or time period) a combined level gain achieving an attenuating amount equal to the highest attenuating amount present (in the time frame or time period) in the derived level gains (or achieving a target loudness equal to the lowest target loudness achieved by the derived level gains). For example, if combining two level gains, one corresponding to a relatively higher attenuation of a loud audio signal, and the other corresponding to a relatively lower attenuation of a weak audio signal, the gain combining stage may assign a combined voice activity gain achieving a relatively higher attenuation with a view to a combination of the loud and weak audio signal.

In some example embodiments, the mixing stage comprises a leveling stage adapted to rescale at least some of the derived audio signals, based on the derived level gains, before the (rescaled) derived audio signals are combined into the combined audio signal. The received audio signals may be rescaled such that they have similar loudness or energy. For example, the audio signals may be rescaled to the same loudness as the signal with the largest (or smallest) loudness. The derived level gains may be indicative of the loudness of the derived audio signals. For example, the leveling stage may apply the rescaling factor $G_i/G_{min}$ to the $i^{th}$ received signal, for each of the derived signals, where $G_{min}$ is the level gain achieving the highest attenuating amount (or the lowest amplifying amount) of the derived level gains, and $G_i$ is the level gain of the $i^{th}$ signal. Alternatively, the audio signals may be rescaled by the full derived level gains $G_i=G_{level,i}$. In this case, the combined level gain $G_{level,comb}$ may be set to one, to the effect that the combined audio signal is not to undergo any further attenuation (related to leveling) in connection with the final decoding.

In some example embodiments, the derived voice activity gains are encoded using coding indices referring to one or more predefined time sequences of gains (i.e., an index may represent a gain in the predetermined time sequence) and the gain combining stage is adapted to determine the combined voice activity gain by assigning a coding index based on coding indices of the obtained level gains. As described in connection with previous example embodiments, a fade-out (or fade-in) sequence may be achieved by a predefined time sequence of gains, represented by a single coding index. This allows for efficient encoding of the voice activity gains, and a simple way to combine the derived voice activity gains. For example, the combined voice activity gain may be encoded (in a time frame) by an index formed as the minimum (or maximum) of the indices of the obtained level gains (in the time frame).

In some example embodiments, the decoder is further adapted to derive, from each of the audio signals (or each of the audio signals among the one or more audio signals combined by the mixing stage), decomposition parameters K and a plurality of rotated audio signals E1, E2, E3. The mixing stage may further comprise an adaptive rotation inversion stage, a mixer, a spatial analyzer and an adaptive rotation stage. The adaptive rotation inversion stage is configured to discretely decode, for each audio signal, its plurality of rotated audio signals into a plurality of de-rotated audio signals, based on the associated decomposition parameters. The mixer is adapted to provide a plurality of combined audio signals by additively mixing (e.g., adding the waveforms or transform coefficients together and/or combining power spectra by a non-linear operation) corresponding de-rotated signals (i.e., a combined audio signal is formed by additively mixing one signal from each of the pluralities of re-rotated signals). The spatial analyzer is configured to receive the plurality of combined audio signals, and to output, based thereon, combined decomposition parameters. The adaptive rotation stage is configured to receive the plurality of combined audio signals and to output a plurality of combined rotated audio signals obtained by an adaptive energy-compacting orthogonal transformation. The quantitative properties of the adaptive orthogonal transformation are determined by the combined decomposition parameters. The plurality of combined rotated audio signals and the combined decomposition parameters may be discretely decodable into a plurality of de-rotated combined audio signals (referred to as a combined sound field representation) approximating the plurality of combined audio signals. In this example embodiment, clearly, the decoding prior to mixing is only partial (i.e., the audio signals need not be converted into a format suitable for playback), which allows for a computationally lean mixing process.

In some example embodiments, the mixing system further comprises a multiplexer adapted to encode the determined combined gains and combined audio signal as one bitstream. The determined combined gains and the combined audio signal may be individually derivable (obtainable) from the bitstream.

Further provided is a mixing method analogous to any of the above example embodiments of mixing systems. It may comprise deriving the voice activity gain and the cleaning gain from each of the received pairs of audio signals and gain profiles. It may further comprise determining a combined voice activity gain by combining the derived voice activity gains and determining a combined cleaning gain by combining the derived cleaning gains, these two operations being performed by two different combining rules. The mixing method may also comprise combining one or more of the audio signals into a combined audio signal to be distributed with (a combined gain profile comprising) the combined voice activity gain and the combined cleaning gain.

An example embodiment provides a computer program product comprising a computer-readable medium with instructions for causing a computer to execute an audio encoding or mixing method with the features discussed above.

II. Notation and Nomenclature

Throughout this disclosure, including in the claims, the terms "speech" and "voice" are used interchangeably, in a broad sense to denote audio content perceived as a form of communication by a human being. Thus, "speech" determined or indicated by an audio signal may be audio content of the signal which is perceived as a human utterance upon reproduction of the signal by a loudspeaker (or other sound-emitting transducer).

Throughout this disclosure, including in the claims, "speaker" and "loudspeaker" are used synonymously to denote any sound-emitting transducer (or set of transducers) driven by a single speaker feed. A typical set of headphones includes two speakers. A speaker may be implemented to include multiple transducers (e.g., a woofer and a tweeter), all driven by a single, common speaker feed (the speaker feed may undergo different processing in different circuitry branches coupled to the different transducers).

Throughout this disclosure, including in the claims, each of the expressions "monophonic" audio, "monophonic" audio signal, "mono" audio, "mono" audio signal, and "mono" audio signal representation denotes an audio signal capable of being rendered to generate a single speaker feed for driving a single loudspeaker to emit sound perceivable by a listener as emitting from one or more sources, but not to emit sound perceivable by a listener as originating at an apparent source location (or two or more apparent source locations) distinct from the loudspeaker's actual location.

Throughout this disclosure, including in the claims, the expression "sound field" audio (or "sound field" audio signal or sound field representation) denotes an audio signal (typically, but not necessarily, a multichannel audio signal) capable of being rendered to generate speaker feeds for driving at least two loudspeakers (e.g., a pair of headphones) to emit sound perceivable by a listener as emitting from one or more sources, including at least one source at an apparent source location distinct from the actual location of any of the loudspeakers. Examples of sound field audio are B-field audio, Ambisonics™, surround stereo audio and the like.

Throughout this disclosure, including in the claims, the expression "monophonic layer" (or "mono layer") of an encoded audio signal denotes content of the encoded audio signal (e.g., a sequence of data values indicated by the encoded audio signal) that is indicative (when decoded) of a monophonic audio signal.

Throughout this disclosure, including in the claims, the expression "sound field layer" of an encoded audio signal (which may also include a monophonic layer) denotes content of the encoded audio signal (e.g., a sequence of data values indicated by the encoded audio signal) that is indicative (together with the monophonic layer, possibly contained therein), when decoded, of a sound field audio signal.

For example, an encoded audio signal may include a sound field layer and a monophonic layer (possibly included in the sound field layer), which together (when decoded) are indicative of a sound field audio signal. When the sound field layer is omitted from this exemplary encoded audio signal, the remaining monophonic layer is (when decoded) indicative of a monophonic audio signal but is not indicative of the sound field audio signal.

Throughout this disclosure, including in the claims, the expression "spatially layered" encoded audio (or "spatially layered" encoded audio signal) denotes an encoded audio signal including at least one monophonic layer and at least one sound field layer. When decoded, at least one said sound field layer, together with at least one said monophonic layer (e.g. comprised in the sound field layer), is indicative of a sound field audio signal. When each said sound field layer is omitted from the spatially layered encoded audio signal, at least one remaining monophonic layer is (when decoded) indicative of a monophonic audio signal, but no remaining monophonic layer is (when decoded) indicative of the sound field audio signal (and when at least two monophonic layers remain, all remaining monophonic layers considered together fail (when decoded) to be indicative of the sound field audio signal).

Throughout this disclosure, including in the claims, the expression performing an operation "on" a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure including in the claims, the term "processor" is used in a broad sense to denote a system or device programmable or otherwise configurable (e.g., with software or firmware) to perform operations on data (e.g., video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

III. Example Embodiments

FIG. 1 shows a tele-conferencing system, which comprises nodes (endpoints 4, 6, and 8, and optionally other endpoints, and teleconferencing server 2) coupled to each other by a link 7. Each of the endpoints is a telephone system (e.g., a telephone). Link 7 can be the link employed by any telephone network (e.g., any conventional telephone network, VoIP network or other packet-switched network) to implement data transfer between telephone systems. In typical use of the system, at least two of the endpoints are involved in a conference telephone call. The teleconferencing system acts as an audio transmission network, the endpoints 4, 6, 8 act as audio encoding systems and/or audio decoding systems, and the link 7 acts as a communication link connecting the audio encoding systems and the audio decoding systems.

The telephone system 4 comprises a microphone M, a loudspeaker S, and an audio processor 10, connected as shown. The audio processor 10 acts as a mono audio encoder (or encoding system) by providing a monophonic audio signal to the tele-conferencing system (i.e. to the other endpoints 6, 8 and/or the server 2, using the link 7) based on monophonic input audio from the microphone M, including performing necessary pre-processing and encoding. The audio processor 10 may determine a gain profile based on the monophonic audio signal, and provide the gain profile to the telephone system together with the monophonic audio signal. The telephone system 4 provides monophonic playback to a user (e.g. a person listening) using the loudspeaker S, based on a (multilayered or spatially layered) audio signal received through the communication link 7. The audio processor 10 acts as a mono audio decoder by decoding the received audio signal and optionally applying a gain profile, to provide the monophonic playback.

The telephone system 6 comprises a microphone array 12 (including three microphones), headphones 13 and an audio processor 11, connected as shown. The processor 11 is configured to assert to link 7 an encoded audio signal (indicative of sound captured by microphone array 12) for transmission over link 7 to server 2 and the other endpoints of the system, including by performing necessary pre-processing and encoding. The processor 11 acts as an audio encoding system by generating a the encoded audio signal as a multilayered (or spatially layered) audio signal comprising a plurality of rotated audio signals, decomposition parameters a gain profile and, optionally, spatial parameters. The processor 11 is also configured to receive (and decode) encoded audio signals transmitted over link 7 from server 2 and/or other endpoints of the system, and to render the decoded audio for playback on the headphones 13. The received encoded audio may be a multilayered (or spatially layered) audio signal, and the processor 11 may act as a sound field audio decoding system by providing a sound field representation of the received audio signal based on a plurality of rotated audio signals, decomposition parameters and a gain profile, all comprised in the received multilayered audio signal. In some embodiments, the processor 11 may instead act as a spatial audio decoding system by performing spatial synthesis based on a first rotated audio signal (or a cleaned version thereof achieved by applying a gain profile received in the multilayered audio signal) and spatial parameters, all comprised in the received multilayered audio signal. In some example embodiments, the audio signals may be represented by complex transform coefficients. The gain profile, or at least one of the voice activity gain, the level gain and the cleaning gain (described above), may be represented by complex numbers to be applied to the complex transform coefficients. It is particularly advantageous to encode the gains in logarithmic form and to encode the transform coefficients in terms of mantissas and exponents, such as per the formula (mantissa)×(base)$^{(exponent)}$. Application of a gain may then correspond to adding the logarithmic gain to the exponent. This is a simple and efficient operation, which enables mixing of signals at low processing effort.

The telephone system 8 comprises a microphone array 15 (including three microphones), a loudspeaker system 16 comprising at least tree loudspeakers and an audio processor 14, connected as shown. Similarly to the processor 11, the processor 14 is configured to assert to link 7 an encoded audio signal, and acts as an audio encoding system by generating the encoded audio signal as a multilayered (or spatially layered) audio signal comprising a plurality of rotated audio signals, decomposition parameters a gain profile and, optionally, spatial parameters. The processor 14 is also configured to receive (and decode) encoded audio signals transmitted over link 7 from server 2 and/or other endpoints of the system, and to render the decoded audio for playback on the loudspeaker system 16. Similarly to the processor 11, the processor 14 may act as a sound field audio decoding system, or alternatively as a spatial audio decoder.

As will be further discussed with reference to FIG. 5, a sound field audio encoder such as the processor 14 in endpoint 8 may produce its output (which is sent to the loudspeaker system 16) by obtaining a plurality of rotated audio signals, a cleaning gain and decomposition parameters from the received encoded audio signal; applying the gain profile to the rotated audio signals to get a plurality of modified rotated audio signals; and then discretely decoding the modified rotated audio signals based on the decomposition parameters. The processor 14 in endpoint 8 may further comprise a downscaling section (not shown), which is controllable by the value of optional parameter α. Parameter α∈[0, 1] determines what percentage of the quantitative instructions encoded in the gain profile g which is to be implemented by the processor 14. Small values of α correspond to light processing, whereby the modified rotated audio signals are more similar to the rotated audio signals, while values of α close to 1 correspond to more processing and will give rise to modified rotated audio signals which may be closer to the modified rotated audio signals intended by the endpoint which is currently feeding audio input into the system. Alternatively, the parameter α may comprise a set of different values to be applied to different components of the gain profile, in order to downscale different types of processing, such as voice activity gating given by $G_{VAD}$, leveling given by $G_{level}$, noise reduction given by $G_{noise}$, sibilance reduction given by $G_{sibilance}$ and/or reverb reduction given by $G_{reverb}$. For example, the downscaled gain profile to be applied to the rotated audio signals may be formed as $$g'=\alpha_1 G_{level}+\alpha_2 G_{VAD}+\alpha_3 G_{noise}+\alpha_4 G_{reverb}+\alpha_5 G_{sibilance}.$$

Tele-conferencing server 2 of the FIG. 1 system includes decoding stage 3 (coupled and configured to receive and decode encoded audio signals transmitted over link 7 from endpoints of the system), mixing stage, or mixing system, 4 (coupled and configured to perform optional mixing of decoded audio signals from endpoints of the system), and encoding stage 5 (coupled and configured to encode mixed audio from stage 4 for transmission over link 7 to some or all endpoints of the system), coupled as shown. Server 2 is operable in a mode in which it simply forwards (without decoding or encoding) encoded audio received over link 7 from any endpoint of the system to some or all of the endpoints of the system.

It is to be noted that in some embodiments, the decoder 3 does not perform a full decoding of the received audio signal before sending it to the mixer. Indeed, the decoder may for example retrieve a multilayered (or spatially layered) signal from a bitstream, but it need not decode the audio signals therein, such as a plurality of rotated audio signals. Instead, the rotated audio signals may be sent to the mixer and may be combined there, in encoded form, with other encoded rotated audio signals, so as to form combined rotated audio signals.

In some example embodiments, the server 2 may apply gain profiles to audio signals. For example, gain profiles may be applied to the received audio signals before the audio signals are mixed or forwarded in the mixer 4. Alternatively, a gain profile may be applied to a combined audio signal obtained by mixing received audio signals in the mixer 4. As described above, a gain profile may be rescaled by a factor α∈[0, 1] before being applied. Alternatively, the parameter α may comprise a set of different values to be applied to different components of the gain profile, in order to downscale different types of processing, such as voice activity gating given by $G_{VAD}$, leveling given by $G_{level}$, noise reduction given by $G_{noise}$, sibilance reduction given by $G_{sibilance}$ and/or reverb reduction given by $G_{reverb}$. For example, the downscaled gain profile to be applied may be formed as $g'=\alpha_1 G_{level}+\alpha_2 G_{VAD}+\alpha_3 G_{noise}+\alpha_4 G_{reverb}+\alpha_5 G_{sibilance}$. A reason for applying the gain profile in the server 2, may be to provide a processed audio signal, ready for use in endpoints without further processing.

Decoding by an element of the system (e.g., element 3, 10, 11 or 14 of the FIG. 1 system) may include transforming encoded frequency-domain data into time-domain data.

The endpoints of the FIG. 1 system are connected to each other in a client-server fashion, and may operate in a client-server mode in which each endpoint sends audio upstream to tele-conferencing server 2, and receives audio which has been sent downstream from server 2. In some cases, server 2 may function in the client-server mode as a mixer (mixing system) or bridge which decodes the audio which has been sent upstream (to the server) from each endpoint, mixes together audio from multiple endpoints, and re-encodes the decoded and/or mixed audio and sends it downstream to an endpoint (or to all or some of the endpoints). In some cases, server 2 may function in the client-server mode by forwarding encoded streams directly from one endpoint to another. In order to offload computational load to the endpoints, server 2 may be operable to forward multiple streams to an endpoint accompanied by instructions on how the endpoint should mix them together before rendering.

Optionally, the endpoints of the FIG. 1 system may be connected to each other in a peer-to-peer fashion, and in some implementations, may operate in a peer-to-peer mode in which encoded audio streams are sent from each endpoint directly to the other endpoints. In such implementations, server 2 may be omitted.

As described above, the processors 11 and 14 may be configured to encode input audio as a spatially layered, encoded audio signal. The following is a (non-exhaustive) list of possible sets of layers to be used in the tele-conferencing system.

E1—A monophonic signal representing a dominating part of an originally captured sound field (typically with no dynamics/spectral processing applied thereto). Signal E1 may be generated (in a manner to be described below) from a horizontal B-format signal captured by microphone array 12 or 15;

E1 g—The above signal E1 with additional metadata ("g") which facilitate creation of a dynamically processed (e.g., having undergone dynamic range compression) and/or spectrally processed (e.g., noise suppressed, equalized) version of the E1 signal suitable for playback on a monophonic device (e.g., a traditional telephone). The metadata "g" are typically indicative of a frequency-banded gain profile. For example, "g" may be indicative of a banded gain profile determining a fully cleaned (or an approximation of a fully cleaned) version of the E1 signal. The metadata g may be regarded as differentially encoding a fully cleaned (or an approximation to a fully cleaned) version of the E1 signal;

E1 g Th—The above-described "E1 g" layer plus an additional metadata layer ("Th") which facilitates upmixing for rendering of the sound (indicated by layer E1 g) as an output sound field (for playback on multiple loudspeakers) indicative of the content (e.g., conference participant utterances) of layer E1 g (i.e., an output sound field containing only utterances of a dominant conference participant), which will be perceived as being emitted from some source position relative to the listener. The source position does not necessarily, and does typically not, coincide with the position of a loudspeaker of the loudspeaker array employed to render the sound field. For example, the upmixed audio (generated in response to the E1 g Th data) may be rendered such that the sound uttered by the dominant talker is perceived as originating from a source position, and the metadata "Th" may be indicative of the source position. The metadata Th may act as spatial parameters for use in spatial synthesis applied to the monophonic layer generated by the "E1 g" layer, to generate a sound field representation;

E1 g Th E2 E3 K—The "E1 g Th" layers plus residual signals E2, E3 and metadata "K" which allow full reconstruction of an original spatial acoustic sound field (minus any coding loss) suitable for rendering over headphones using binaural virtualization techniques or for rendering over a loudspeaker array using sound field decoding techniques. The original sound field is assumed to have a multichannel representation (WXY), indicative of sound captured by a microphone array (to which some light processing may have been applied). Typically, a transmission indicative of such a WXY representation is a continuous transmission (in which frames of data are continuously transmitted, even during periods of speech inactivity). The originally captured sound field (WXY) is also assumed to have a rotated or mixed representation (E1 E2 E3) which is an instantaneously (or based on values of the captured sound field from a relatively short time period e.g. using time smoothing) rotated or mixed version of WXY, where E1 is the above-mentioned monophonic signal representing a dominant part of the captured sound field. The metadata "K" are indicative of rotation parameters (or decomposition parameters) used in the mapping of WXY to E1 E2 E3 (or E1 E2 E3 to WXY), and can be used for full reconstruction of WXY from E1 E2 E3 K. Typically, the metadata "K" indicate a specification of the rotation (or transformation), and if utilized, parametric encoding or waveform resynthesis information. The metadata "g" may be indicative of a banded gain profile determining fully cleaned (or an approximation of fully cleaned) versions of the E1 E2 and E3 signals; and E1 g E2 E3 K—The E1 g Th E2 E3 K layer but without the metadata "Th". This layer allows full reconstruction of an original spatial acoustic sound field (minus any coding loss) suitable for rendering over headphones using binaural virtualization techniques or for rendering over a loudspeaker array using sound field decoding techniques.

In some example embodiments, the notation "WXY" may represent a multichannel audio signal indicative of a sound field captured by a microphone array. Typically, but not necessarily, the WXY signal may be indicative of horizontal B-format multichannel audio data, said data have a frequency domain representation in which for each frequency, the data are indicative of a time-dependent amplitude (W) of a source, at an azimuth angle θ with respect to the capturing microphone array, the component "W" is an omnidirectional, time-dependent amplitude, and the components "X" and "Y" are X=(cos θ)×W, and Y=(sin θ)×W. Optionally, to generate the WXY audio, light processing (e.g., cleaning, rendering, mixing, and/or other manipulation) is applied to audio (e.g., horizontal B-format audio) captured by a microphone array.

The rotated sound field representation (E1 E2 E3 K, as mentioned above) of a horizontal B-format signal WXY is an instantaneously (or based on values of the captured sound field from a relatively short time period e.g. using time smoothing) rotated or mixed version of WXY. E1 is derived from WXY, and E2 and E3 are audio signal components that are sufficient, with component E1 (and metadata K), to reconstruct the originally captured WXY sound field audio. The metadata K are indicative of the rotation (i.e., the angle(s) of rotation) performed to generate the rotated audio data E1, E2, and E3 in response to the input WXY data.

The "E1" content typically approximates the dominant component of a captured sound field at any instant in time, and is typically obtained by rotation of a captured sound field signal to place the largest energy or perceptual signal entropy in a first channel (the E1 channel). This is advantageous for two reasons:

the rotation allows a dynamic allocation of bits across multiple audio channels with more being allocated for the first channel, and/or subsequent channels utilizing parametric approaches to coding; and the component allocated to the first channel (E1) is usually (similar or close to) the desired mono signal, and typically has an amount of noise suppression related to the diversity of the capturing microphone array and/or the order of the sound field representation.

Generally, a fast rotation provides the best coding gain by optimizing the allocation of bits to the multiple channels at each block instant. However, rapid variations in the rotation could result in the signal E1, when heard on its own, being unstable. Hence, time smoothing may be employed, in which the rotations used to generate the rotated audio signals E1, E2, E3 are based on averages (or linear combinations) of values obtained from the captured sound filed at different times (or, if the signals are segmented into time frames, during different time frames).

For details on the processing allowing to obtain inter alia the rotated audio signals E1, E2, E3 and metadata K, reference is made to the applicant's co-pending U.S. Provisional application entitled "Coding of a sound field signal" referenced above.

A single, layered encoded audio signal (one encoded bitstream) can be encoded in layered fashion to include all or some of the noted layers, in the sense that the signal includes data sufficient for a decoder (configured to decode audio encoded in accordance with a first subset of the layers) to decode the first subset of the layers of the signal, and for a decoder (configured to decode audio encoded in accordance with a second subset of the layers) to decode the second subset of the layers of the signal, and so on for all subsets of the encoding layers. Thus, a decoder configured to decode audio encoded in accordance with the E1 g Th E2 E3 K scheme can decode an encoded signal (comprising data E1, g, Th, E2, E3, and K) to reconstruct the original sound field WXY (e.g., as captured with a microphone array) or the rotated sound field E1 E2 E3, optionally including by using the "g" metadata to decode a dynamically (e.g., compressed) and/or spectrally processed version of the sound field. Similarly, a decoder configured to decode audio encoded in accordance with the E1 g scheme can decode an encoded signal (comprising data E1 and g) to reconstruct the above-noted monophonic signal E1, optionally including by using the "g" metadata to decode a dynamically (e.g., compressed) and/or spectrally processed version of the monophonic signal.

In typical embodiments, each of upstream audio (audio sent upstream from an endpoint to a server) and downstream audio (audio sent downstream from a server to an endpoint) may be encoded using a spatially layered encoding scheme. In these embodiments, monophonic endpointssend audio encoded with one or more monophonic layers (e.g., E1, or E1 g layers, or one or more similar or equivalent monophonic layers), and sound field endpoints can send audio encoded with one or more monophonic and/or sound field layers (e.g., any of the layers described above, or one or more similar or equivalent layers). In accordance with typical method embodiments, each endpoint and conferencing server of a teleconferencing system determine (e.g., determine cooperatively) in which of the available layers each audio stream should be coded and transmitted, and how the coded audio may be used at the server and at each endpoint.

In considering a telephony system and a spatially layered coding scheme, two important properties should be noted. First, as long as the encoding is performed in a suitable way, a server wanting to forward a packet (sent upstream to the server) to a downstream endpoint may optionally demote a stream from a higher fidelity representation to a lower fidelity representation simply by removing layers of information. For example, if a packet is received from endpoint A (e.g., endpoint 6 or 8 of FIG. 1) in format E1 g Th E2 E3 K, the server may choose to truncate the packet when forwarding, such that only layers E1 g are received at endpoint B (e.g., endpoint 4 of FIG. 1). This would have the effect that endpoint B is unable to render the full sound field of endpoint A, but can only render a monophonic representation of the sound field. However, endpoint A is still capable of rendering a distortion-free (disregarding perceptual coding artifacts) monophonic signal while the server has reduced the entropy transmitted on the downstream link.

Second, just as a server may discard information when forwarding a packet, an endpoint (e.g., any of endpoints 4, 6, and 8 of FIG. 1) receiving an encoded packet, from a server (in the client-server case) or directly from another endpoint (in the peer-to-peer case), may choose to freely discard layers of information and render the stream at a lower spatial fidelity. This enables an endpoint device which is incapable of rendering a sound field to make use of a stream which is sound field-encoded.

In both cases it is possible for a packet to be received (by a server or endpoint) which contains redundant information. Such redundant information is not harmful to the correct operation of the system except that in it causes more data to be exchanged than is strictly necessary. In such cases, it would typically be preferable to decrease the number of layers in which the audio is coded to save bandwidth. In a similar way, there may be times when a server or client could make use of additional information not currently contained within incoming transmissions. In such cases, it may be preferable to increase the number of layers in which the audio is coded to increase spatial fidelity. Therefore, some method embodiments employ feedback systems, for example, as follows:

1. a server may send feedback information to a client to ask the client to increase or decrease the number of layers in subsequent upstream audio transmission, or
2. a client may send feedback information to a server to ask the server to increase or decrease the number of layers in subsequent downstream audio transmission, and/or
3. a client may send feedback information to another client to ask said other client to increase or decrease the number of layers in subsequent peer-to-peer audio transmission.

Figure 2:
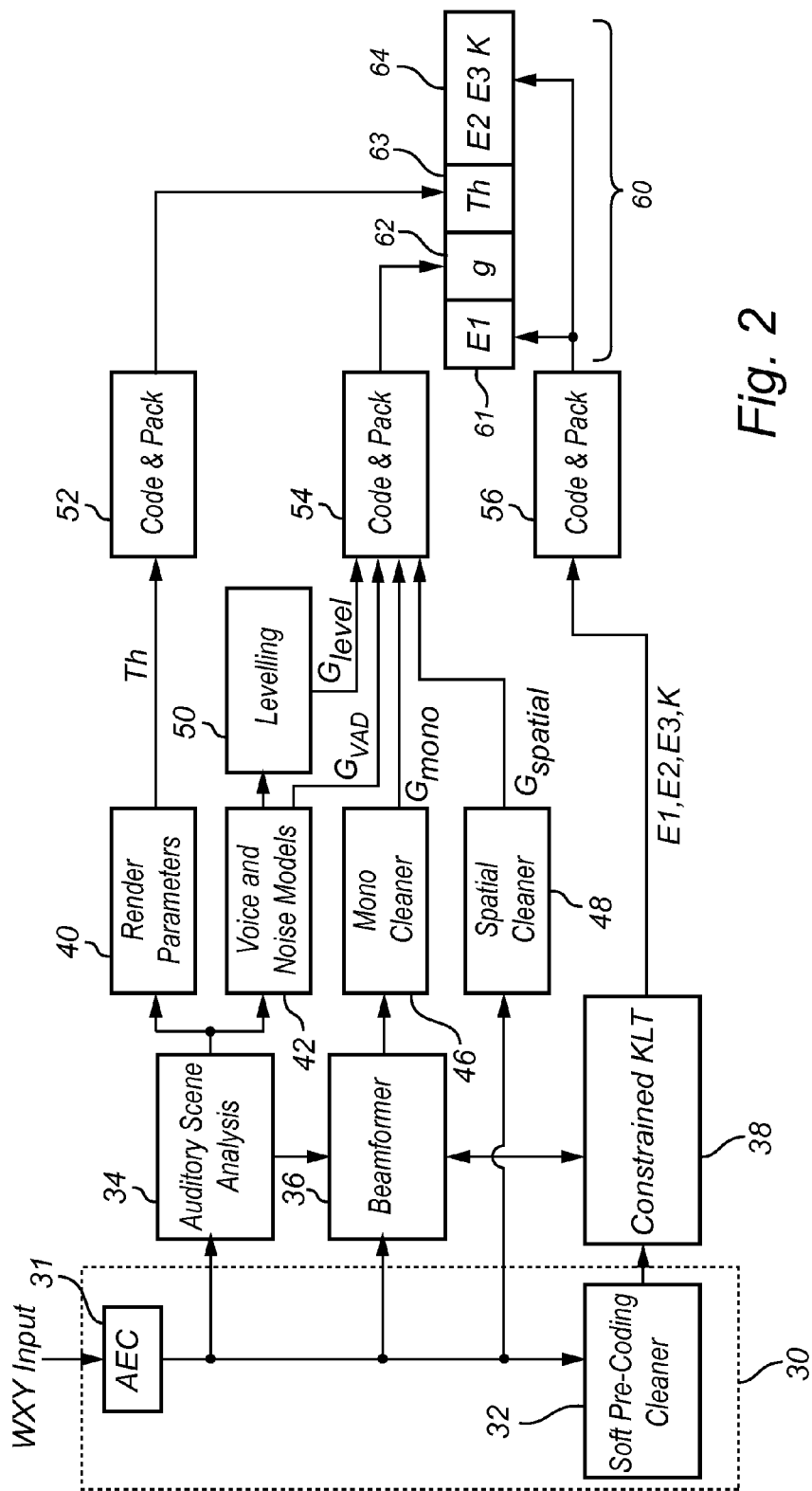
FIG. 2 is a block diagram of an audio encoding system according to an embodiment of the invention.

FIG. 2 is a block diagram of an embodiment of an encoding subsystem (e.g., encoder 10, 11 or 14 of FIG. 1) acting as an audio encoding system. The encoder of FIG. 2 is coupled to receive input audio data, WXY, which may be horizontal B-format multichannel audio data indicative of a sound field captured by a microphone array. Pre-processing stage 30 of the FIG. 2 encoder includes AEC stage 31, configured to perform acoustic echo cancellation (e.g., conventional acoustic echo cancellation) on the input audio and soft pre-coding cleaning stage 32, configured to perform cleaning (e.g., noise reduction) on the input audio.

The output of stage 31 is asserted to auditory scene analysis stage 34 and to beamforming stage 36. Stage 34 may be implemented in a conventional manner to analyze (e.g., by applying statistical analysis to) the echo-cancelled input audio (which is indicative of a multiple microphone sound field capture) to segment the audio, and to identify audio objects indicated by the signal (e.g., an audio object indicated by each segment of the signal). Each segment (a stream of audio data samples) may be identified as being indicative of sound emitted from a specific source or set of sources. Stage 34 may determine (e.g., in a conventional manner) a scene map (or "scene description" or "sound scene") comprising data describing each identified audio object (e.g., data indicating a type or source of each object, and a location or trajectory of at least one source which emits the sound comprising the object). An example of an audio object is sound emitted from a specific source (e.g., voice uttered by a specific person). Stage 34 also generates voice and noise models 42 (to be described below).

Scene analysis stage 34 typically determines an updated scene description in response to each segment of the audio signal, which typically includes a set of audio objects indicated by the signal and an associated scene state. This description is stored (e.g., in a register or set of registers) and made available to other elements of the FIG. 2 system. Examples of objects and associated parameters included in the scene description include one or more of: direction mean and variance (e.g., indicative of location of a conference participant who utters speech indicated by the audio signal); distance mean and variance (e.g., indicative of location of a conference participant who utters speech indicated by the audio signal); degree of diffusivity; likelihood or ratio of detected voice activity from an object; likelihood that (or another state variable related to determination that) an object is a nuisance rather than a non-nuisance object (e.g., where the non-nuisance object is speech uttered by a voice conference participant, the nuisance might be typing or other background noise present during the voice conference along with speech uttered by conference participants); last time active; relative participation in local scene; relative participation in a voice conference; classification as desirable or undesirable object; and estimated level of voice activity from the object.

Rendering parameters 40 are generated by stage 34. These parameters determine the above described "Th" metadata (or spatial parameters), and may include parameters indicative of the orientation of the current dominant talker of a conference relative to a capturing microphone array or an assumed listener position. The "Th" metadata facilitates upmixing (or spatial synthesis) for rendering of the sound (indicated by layer E1, or E1 g) as an output sound field indicative of the audio content of layer E1, or E1 g (e.g., an output sound field containing only utterances of a conference participant who is a dominant talker). For example, the upmixed audio (determined using the Th metadata) may be rendered such that the sound uttered by a dominant talker is perceived as originating from a specific source position, and the metadata "Th" may be indicative of the source position.

Stage 34 of the FIG. 2 encoder is configured to perform voice detection on the echo-cancelled input audio to identify voice segments and noise segments thereof, and for each voice segment, determines an estimated voice level for the segment. Stage 34 may also be configured to determine, for each noise segment, an estimated noise level for the segment. Stage 34 determines voice and noise models 42 which are indicative of the results of these operations. The models 42 may be indicative of at least one characteristic (e.g., level) of the noise of the echo-cancelled input audio. Leveling stage 50 is coupled and configured to determine, from models 42, gain values (metadata), $G_{level}$, which are useful for performing leveling on the echo-cancelled input audio, including by determining an updated gain for each voice segment of the audio, and an updated gain for each noise segment of the audio. Hence, Stages 34, 42 and 50 together act as a loudness analyzer. Each voice (or noise) segment can be modified (e.g., at an endpoint which receives a transmitted version of the audio, or a rotated representation, E1, E2, E3, K, thereof) by applying a gain (determined by the relevant one(s) of the $G_{level}$ values) thereto such that an estimated voice (or noise) level determined for the segment is shifted to a predetermined target level. Stage 34 may include a voice detection stage detecting voices in the audio input, and the voice and noise models 42 determined by Stage 34 may include gain values (metadata) $G_{VAD}$ which are useful for performing phrasing and fade-in and fade-out related to voice activity detection (e.g. VAD gating). Hence, Stages 34 and 42 together act as a voice activity detector. As is known to persons skilled in the art, the partial signals and information obtained in the analysis stages of the pre-processing and encoding may be used together with rules, heuristics, adaption and thresholds to achieve a measure of voice activity detection. In some example embodiments, this may be achieved using derived statistical parameters from the input signals such as banded powers, distance from the noise and/or echo level and appropriate longer term means and variances of the same. Such features can be used to train an appropriate classifier using, for example, techniques known in the art such as adaptive boosting or support vector machines. In some example embodiments, the voice activity analysis may provide input and also draw state information from the auditory scene analysis which may help to provide confidence, adaption and thresholds around the classification of voice activity at any point in time.

Sound field audio cleaning stage 48 is coupled and configured to determine cleaning (e.g., noise reduction and/or equalization) to be performed on the echo-cancelled sound field audio output from stage 31. Typically, the cleaning is to be performed (in an endpoint) in the frequency-domain on a frequency-banded, frequency-domain representation of the data asserted to stage 48, and is (or is equivalent to) attenuation, on a frequency band-by frequency band basis, of the frequency components in each band of the data. Stage 48 generates "$G_{spatial}$" metadata indicative of the attenuation to be performed on each frequency band of the data.

Beamforming stage 36 of the FIG. 2 encoder is configured to calculate an appropriate set of parameters relating to estimation of signal content in a desired spatial direction of the echo-cancelled input audio, and the impact this will have on the subsequent gain parameter derivations. This may involve generating a monophonic audio signal (e.g., above-mentioned signal/layer E1) representing the signal content in the desired spatial direction, in response to the echo-cancelled input audio. Monophonic audio cleaning stage 46 is coupled and configured to determine cleaning (e.g., noise reduction and/or equalization) to be performed on the signal content in the desired spatial direction estimated in Beamforming stage 36 (or performed on the monophonic audio signal generated therein). Typically, the cleaning is to be performed (in an endpoint) in the frequency-domain on a frequency-banded, frequency-domain representation of the data (e.g. a monophonic signal E1) asserted to stage 46, and is (or is equivalent to) attenuation, on a frequency band-by frequency band basis, of the frequency components in each band of the data. Stage 46 generates "$G_{mono}$" metadata indicative of the attenuation to be performed on each frequency band of the data.

It is to be noted that the suppression and aspects following from the beam former analysis may eventually be applied to the E1 signal in decoding operations. Hence the beamforming analysis 36 and the constrained KLT 38 may be intricately entwined and share information as shown in FIG. 2. As indicated in FIG. 2, the beamforming stage 36 may (in some example embodiments) use additional instantaneous spatial information from the constrained KLT 38 and the output of the auditory scene analysis 34 to calculate an aspect of a frequency and time variable gain that may be included in the subsequent gain profile calculations and a gain profile specific to the case of a monaural audio case where it is desired to focus on a specific spatial object (and this may differ from the calculated focus and direction of the signal E1 at that time). In this way, spatial aspects of the gain profile, that may be included in the set of encoded gain profiles, may be used to reduce/overcome to some degree the difference between the (first rotated) audio signal E1, which is adapted to achieve coding efficiency of the plurality of audio signals WXY, and the intended/desired audio signal, which is intended to contain the most perceptually relevant object for monaural output. Typically, the noise reduction determined by the "$G_{mono}$" metadata and "$G_{spatial}$" metadata improves the ratio of the desired (voice) and background (noise) signal in the relevant content. Hence, the $G_{mono}$ and $G_{spatial}$ metadata acts as components of a cleaning gain $G_{clean}$ generated by the stages 36, 46 and 48 together acting as a noise estimator.

The processing in stages 50, 46, and 48 (and 34) perform a stack of analysis, but does not apply it to the audio being encoded. Rather, it determines metadata "g" which in turn determines instructions for endpoints which receive the encoded audio data. The endpoints may or may not actually implement these instructions. For example, each endpoint could be implemented to be capable of choosing how aggressively to apply the processing envelope or instructions determined by the metadata "g."

Transform stage 38 of the FIG. 2 encoder is configured to transform (by rotation) the cleaned WXY data (asserted at the output of stage 32) into E1 E2 E3 K data of the type described above. As noted above, the WXY data may determine a horizontal B-format multichannel representation of a captured sound field, which assumes a time-dependent amplitude (W) of a source at azimuth angle θ with respect to a capturing microphone array. Optionally, to generate WXY, light processing (e.g., cleaning, rendering, mixing, and/or other manipulation) is applied to B-format audio originally captured by a microphone array. The component "W" may be an omnidirectional, time-dependent amplitude, and the components "X" and "Y" may be X=(cos θ)×W, and Y=(sin θ)×W. Of course, a frequency domain representation of WXY data has three components (W(ω), X(ω), and Y(ω)) for each frequency (or frequency band) ω. Stage 38 rotates the input WXY data to generate rotated audio data E1, E2, and E3, and metadata K indicative of the rotation performed. Assuming a frequency domain representation of the WXY data having components (W(ω), X(ω), and Y(ω)) for each frequency (or frequency band) w, the rotated audio data has a frequency domain representation comprising components, E1 (ω), E2(ω), and E3(ω), for each frequency (or frequency band) w, and the metadata K comprises components K(ω), for each frequency (or frequency band) w. The rotation may be performed such that the component E1 (i.e., the components E1 (ω), in the frequency domain representation) is indicative of a dominant participant (talker) in the conference, and the position (i.e., azimuthal angle) of the dominant participant relative to the position of the capturing microphone array may be determined by the metadata K.

In typical embodiments, neither the mono channel determined by stage 36 nor the E1 component determined by stage 38 is derived as a static mixdown of captured channels, but rather is a signal component which has been adaptively extracted from a multichannel captured signal, and is preferably both suited to mono use and constrained in 'steering' to be perceptually plausible. The monophonic layer is typically extracted from the spatially layered encoded signal in such a way as to allow pre-processing (e.g., noise suppression) to be applied efficiently thereto to make it more suitable for use in monaural presentation (e.g., audio data indicative of the monophonic layer's content is extracted with metadata indicative of pre-processing to be performed on the audio data). The pre-processing application is typically not simply a change in signal-to-noise ratio, but rather is a perceptually guided continuous time/frequency masking to highlight a voice of interest, achieving leveling, noise removal and reverb reduction collectively or in any combination.

Coding and packing stage 52 is configured to generate "Th" metadata (of the above-described type) in response to the parameters 40, and to assert this metadata in an appropriate segment (segment 63) of each block (60) of the spatially layered encoded audio generated by the FIG. 2 system. In one implementation, stage 52 (and each of below-described stages 54 and 56) is configured to transform into the frequency domain the data asserted to its input(s), and to organize the resulting frequency-domain data into a serial bitstream for packing into the appropriate segment of each block of the spatially layered encoded audio.

Coding and packing stage 54 is configured to generate the above-described "g" metadata in response to all or some of the above-noted $G_{level}$, $G_{VAD}$, $G_{mono}$, and $G_{spatial}$ metadata generated in stages 50, 42, 46, and 48, and to assert this "g" metadata in an appropriate segment (segment 62) of each block (60) of the spatially layered encoded audio generated by the FIG. 2 system. Typically, the "g" metadata output from stage 54 is indicative of the gain profile that could have been applied to E1 at the capture point to improve the signal for mono delivery, and thus should be applied to E1 at the endpoint to improve the signal as rendered at the endpoint. This gain profile typically implements noise reduction and reverb reduction (as indicated by $G_{mono}$), and leveling (as indicated by $G_{level}$)

Coding and packing stage 56 is coupled and configured to receive the E1, E2, E3, and K values generated in stage 38, to assert the E1 data (or a transformed version of the E1 data) in an appropriate segment (segment 61) of each block (60) of the spatially layered encoded audio generated by the FIG. 2 system, and to assert the E2 E3 K data (or a transformed version thereof) in an appropriate segment (segment 64) of each block (60) of the spatially layered encoded audio generated by the FIG. 2 system.

In typical embodiments, the spatially layered encoded audio generated by the FIG. 2 system is transmitted (to a server, or to at least one endpoint) as a serial bitstream comprising a sequence of packets (blocks) 60 of bits. Discarding of layers is implemented simply by truncating each packet (e.g., to eliminate the bits in segment 64, or segments 63 and 64, of packet 60).

Consider an example in which each packet 60 consists of one hundred bytes of encoded audio data: the first 40 bytes (in segment 61) are the E1 audio data; the next 10 bytes (in segment 62) are the "g" metadata; the next 5 bytes (in segment 63) are the "Th" metadata; the next 20 bytes (in segment 64) are the E2 information; the next 20 bytes (also in segment 64) are the E3 information, and the last 5 bytes (also in segment 64) are the "K" metadata. By simply omitting the last 45 bytes when the packet is forwarded by a server, the downstream client receives only the following data: E1 (40 bytes), g (10 bytes), and Th (5 bytes). A stream comprising such truncated packets (each comprising 55 bytes) has monophonic layer (the E1 bits, or the E1 and "g" bits considered together) with a gain profile (determined by the "g" bits) and a sound field layer (the "K" bits) indicative of a direction of arrival of the audio determined by the E1 bits. Monophonic layer E1 (or "E1 g") with layer Th, when decoded, are indicative of a sound field audio signal.

In typical embodiments, a decoder recognizes the start, end, and format of each packet of a bitstream of spatially layered encoded audio (generated in accordance with an embodiment) as follows. The length of the packet is contained within a header (e.g., the Internet Protocol header) of the bitstream which encapsulates the packet. The encapsulating protocol (e.g., the UDP/IP protocol) provides payload length information. For example, the decoder might call the standard Berkeley Sockets recvfrom( ) function (available on virtually all operating systems) which returns: payload, payload length, source IP address, and source port.

Figure 9:
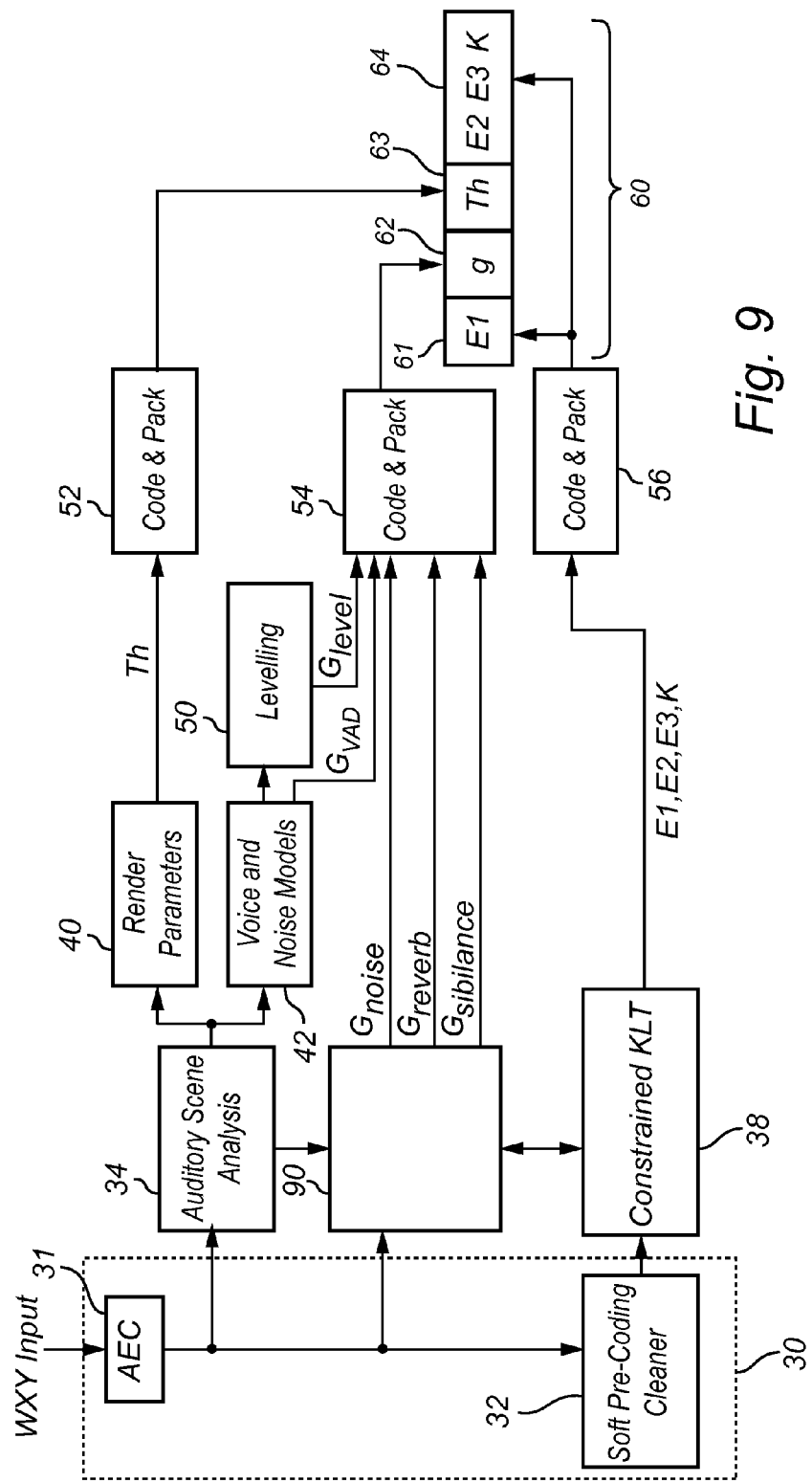
FIG. 9 shows an audio encoding system according to an embodiment of the invention.

FIG. 9 shows an alternative embodiment of an encoding system, similar to the encoder in FIG. 2. In the present embodiment, the gain profile g comprises the components, $G_{level}$, $G_{VAD}$, $G_{reverb}$, $G_{sibilance}$ and $G_{noise}$ instead of the components $G_{level}$, $G_{VAD}$, $G_{mono}$, and $G_{spatial}$. The $G_{level}$ and $G_{VAD}$ components are generated by auditory scene analysis, voice and noise models, voice detection and leveling, as in FIG. 2. In the present embodiment, a noise estimator 90 receives the output of the pre-processing stage 30 and outputs (a cleaning gain $G_{clean}$ comprising) a reverb gain $G_{reverb}$, a sibilance gain $G_{sibilance}$ and a noise gain $G_{noise}$. The reverb gain $G_{reverb}$ is adapted to attenuate room acoustics components, the sibilance gain $G_{sibilance}$ is adapted to attenuate sibilance component and the noise gain $G_{noise}$ is adapted to attenuate other types of noise. Compared to $G_{mono}$, and $G_{spatial}$ in FIG. 2, which gave two different cleaning (noise attenuation) options adapted for mono and spatial playback respectively, the present embodiment provides the possibility to choose different functional aspects of cleaning (noise attenuation), such as sibilance reduction and reverb reduction. The gains $G_{reverb}$, $G_{sibilance}$ and $G_{noise}$ may be determined by similar means as the gain components $G_{level}$, $G_{VAD}$, $G_{mono}$, and $G_{spatial}$ described with reference to FIG. 2.

Figure 3:
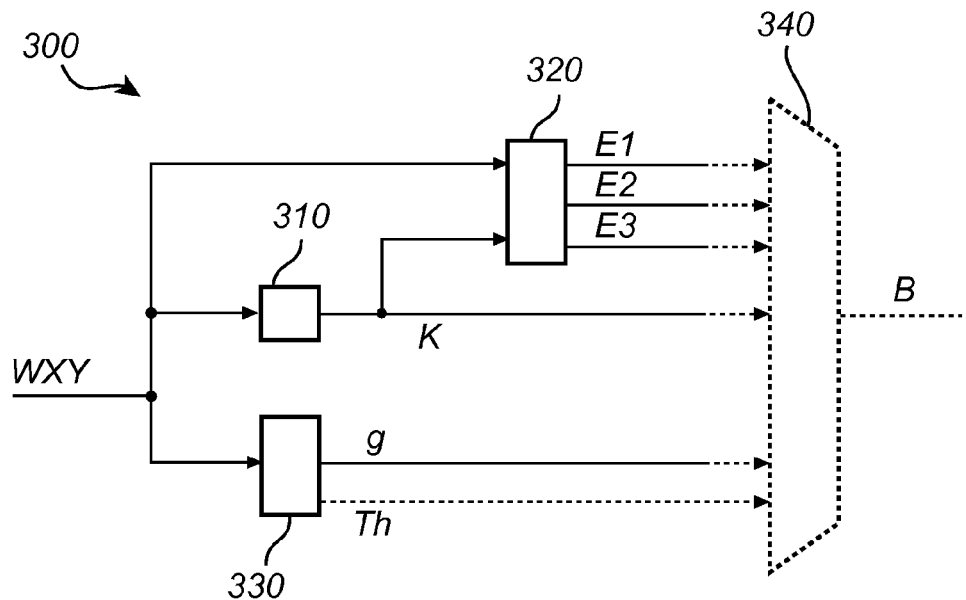
FIG. 3 is a block diagram of an audio encoding system according to an embodiment of the invention.

FIG. 3 illustrates an audio encoding system 300 according to an example embodiment. A spatial analyzer 310 receives a plurality of audio signals W, X, Y and outputs decomposition parameters K based on the plurality of audio signals W, X, Y. The plurality of audio signals may be three (single-channel) audio signals, and the decomposition parameters may be three parameters d, φ and θ, parameterizing a decomposition matrix. The decomposition parameters may be in quantized form.

An adaptive rotation stage 310 receives the decomposition parameters K and the plurality of audio signals W, X, Y, and outputs a plurality of rotated audio signals E1, E2, E3. The rotated audio signals E1, E2, E3 are obtained from the plurality of audio signals W, X, Y by applying an adaptive energy-compacting orthogonal transformation. Quantitative properties of the orthogonal transformation are determined by the decomposition parameters K. For example, there may be three rotated audio signals E1, E2, E3, and the adaptive energy-compacting orthogonal transformation may be performed by applying a decomposition matrix parameterized by the decomposition parameters K. The orthogonal transformation is (at least approximately) invertible and (approximated versions of) the audio signals W, X, Y are obtainable from the rotated audio signals E1, E2, E3 using the decomposition parameters K. In other words, the rotated audio signals E1, E2 and E3, and the decomposition parameters are discretely decodable into a first sound field representation provided by the audio signals W, X, Y.

An analysis stage 330 receives the plurality of audio signals and outputs a time-variable gain profile g based on the plurality of audio signals W, X, Y. The gain profile g comprises at least one frequency-variable component which when applied to at least one of the plurality of rotated audio signals (or at least one signal derived therefrom, such as de-rotated versions of the rotated audio signals obtained by discrete decoding using the decomposition parameters) attenuates non-voice content. Optionally, the analysis stage 330 also outputs spatial parameters Th based on the plurality of audio signals W, X, Y. The spatial parameters are adapted for use in spatial synthesis of the first rotated audio signal E1 (or a signal derived therefrom, such as a modified version of the first rotated audio signal obtained by applying the cleaning gain to the first rotated audio signal) into a second sound field representation different from the first sound filed representation.

The audio encoding system 300 may output the rotated audio signals E1, E2, E3, the decomposition parameters K and the gain profile g (and if they are provided by the analysis stage, the spatial parameters Th). Alternatively, the audio encoding system 300 comprises a multiplexer 340 which multiplexes (encoded version of) the rotated audio signals E1, E2, E3, the decomposition parameters K and the gain profile g (and if they are provided by the analysis stage, the spatial parameters Th) into a bitstream B. This bitstream B may form output of the audio encoding system 300.

Figure 4:
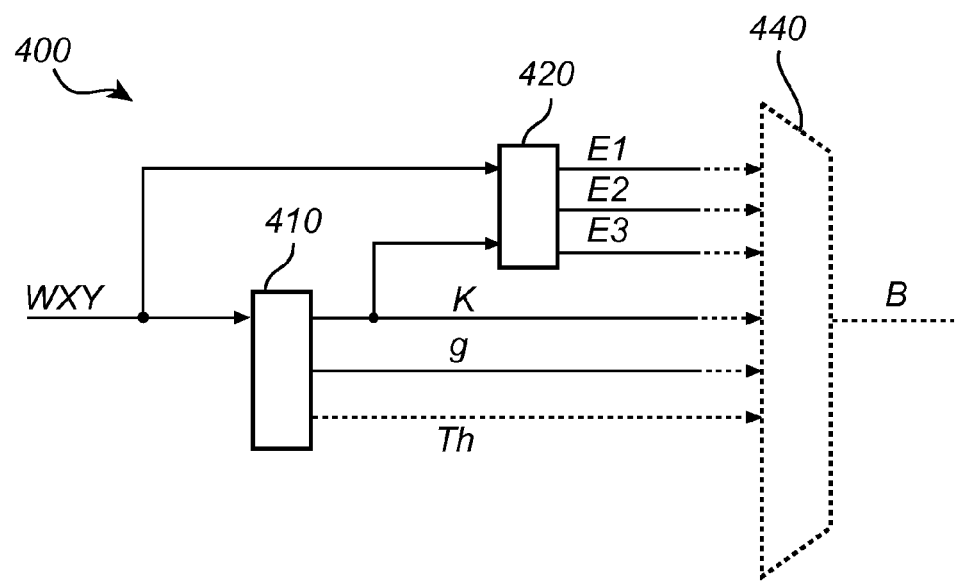
FIG. 4 is a block diagram of an audio encoding system according to an embodiment of the invention.

FIG. 4 illustrates an example embodiment of an audio encoder 400 which may be an alternative to the embodiment illustrated in FIG. 3. In the present embodiment, the analysis stage is the same as the spatial analyzer 410 (e.g. they represent different functional aspects of a common processing stage or unit). The spatial analyzer 410 receives the plurality of audio signals W, X, Y and outputs the decomposition parameters K as well as the gain profile g and optionally also the spatial parameters Th. An adaptive rotation stage 420 receives the plurality of audio signals W, X, Y and outputs the plurality of rotated audio signals E1, E2, E3 using an adaptive energy-compacting orthogonal transformation with quantitative properties determined by the decomposition parameters K. Optionally, a multiplexer 440 multiplexes (encoded version of) the rotated audio signals E1, E2, E3, the decomposition parameters K and the gain profile g (and if they are provided by the analysis stage, the spatial parameters Th) into a bitstream B.

Figure 5:
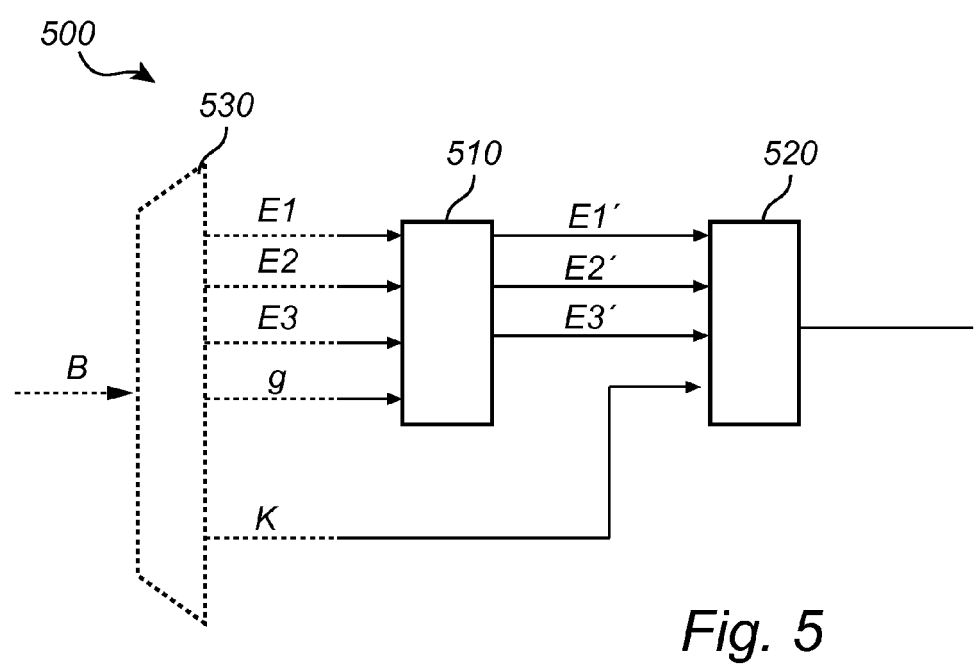
FIG. 5 illustrates an audio decoding system according to an embodiment of the invention.

FIG. 5 illustrates a sound field audio decoding system 500 according to an example embodiment. The sound field audio decoding system 500 provides a sound field representation of a plurality of audio signals W, X, Y based on a plurality of rotated audio signals E1, E2, E3, a time-variable gain profile g and decomposition parameters K. The rotated audio signals E1, E2, E3 are obtainable from the plurality of audio signals W, X, Y using an adaptive energy-compacting orthogonal transformation, such as in the audio encoding system 300 of FIGS. 3 and 4. The gain profile g may e.g. be generated as described in either of FIGS. 2 and 9. The gain profile g comprises at least one frequency-variable component, which when applied to at least one of the plurality of rotated audio signals (are at least one signal derived therefrom) attenuates non-voice content. A cleaning stage 510 receives the rotated audio signals and the cleaning gain g and outputs a plurality of modified rotated audio signals E1', E2', E3' by applying the time-variable gain profile g to the plurality of rotated audio signals.

The sound field audio decoder 530 may further comprise a downscaling section (not shown), which is controllable by the value of optional parameter α. Parameter α∈[0, 1] determines what percentage of the quantitative instructions encoded in the gain profile g which is to be implemented by the cleaning stage 510. Alternatively, the parameter α may comprise a set of different values to be applied to different components of the gain profile, in order to downscale different types of processing, such as voice activity gating given by $G_{VAD}$, leveling given by $G_{level}$, noise reduction given by $G_{noise}$, sibilance reduction given by $G_{sibilance}$ and/or reverb reduction given by $G_{reverb}$. For example, the downscaled gain profile to be applied to the rotated audio signals may be formed as $g' = \alpha_1 G_{level} + \alpha_2 G_{VAD} + \alpha_3 G_{noise} + \alpha_4 G_{reverb} + \alpha_5 G_{sibilance}$.

An adaptive rotation inversion stage 520 discretely decodes the plurality of modified audio signals E1', E2', E3' into the sound filed representation of the plurality of audio signals W, X, Y based on the decomposition parameters K.

The sound field audio decoding system 500 may comprise a demultiplexer 530, deriving the plurality of rotated audio signals E1, E2, E3, the gain profile and the decomposition parameters from a bitstream B.

FIG. 6 shows an embodiment of an audio encoding system 600 including a transducer 621 for converting an acoustic excitation into a plurality of input signals L, R, S in digital form, which propagate in an electric conductor, optical medium or the like. The input signals L, R, S are represented in the time domain, e.g., as waveform signals provided as functions of time. The input signals L, R, S may be segmented into time blocks or time frames. A time-to-frequency transform stage is provided in one of the locations indicated by reference numbers 622, 627 and 628. There is provided a multichannel encoder 625, in relation to which all of these locations are further upstream. A frequency-domain representation of the type to be output from the time-to-frequency transform stage associates each time block or time frame of the signal with values of transform coefficients. The multichannel encoder 625 executes a rate allocation process and outputs a multichannel bitstream $b_{3ch}$ with transform coefficients of the rotated audio signals E1, E2, E3, at least in selected frequency subbands. The multichannel bitstream $b_{3ch}$ is supplied to a multiplexer 626 at the output side of the encoding system 600; the multiplexer 626 provides an output bitstream B. A combined spatial analyzer and adaptive rotation stage 424 determines decomposition parameters and carries out an orthogonal transformation, the quantitative properties of which are determined by the decomposition parameters. As such, the combined spatial analyzer and adaptive rotation stage 624 receives audio signals W, X, Y and outputs rotated audio signals E1, E2, E3 by way of an energy-compacting orthogonal transform controlled by (optionally quantized) decomposition parameters $\hat{d}$, $\hat{\varphi}$, $\hat{\theta}$. The adaptive rotation stage 624 effects a transformation corresponding to an orthogonal matrix $$V(d, \varphi, \theta) = \left[ \begin{bmatrix} c(1-d) & 0 & cd \\ cd\cos\varphi & -\sin\varphi & -c(1-d)\cos\varphi \\ cd\sin\varphi & \cos\varphi & -c(1-d)\sin\varphi \end{bmatrix} \begin{bmatrix} 1 & 0 & 0 \\ 0 & \cos\theta & -\sin\theta \\ 0 & \sin\theta & \cos\theta \end{bmatrix} \right]^T,$$

wherein $c=1/\sqrt{(1-d)+d^2}$. The (optionally quantized) decomposition parameters $\hat{d}$, $\hat{\varphi}$, $\hat{\theta}$ determine the entries of the orthogonal matrix V and are also supplied as input to the multiplexer 626, which includes them into the output bitstream B of the system. A spectral envelope Env and a noise offset No, which are to be used as metadata in the decoding process, are (determined by the combined spatial analyzer and adaptive rotation stage 624 and) supplied to the multiplexer 626 as well.

In the embodiment shown, the encoding system 600 comprises an optional pre-conditioning stage 623 configured to convert the input audio signals into an equal number of audio signals to be supplied to the combined spatial analyzer and adaptive rotation stage 624 (or possibly, to a time-to-frequency transform stage 627 located upstream of this). The pre-conditioning stage 623 forms a linear combination corresponding to the matrix $$P(h) = \frac{1}{3} \begin{bmatrix} 2h & 2h & 2h \\ 2 & 2 & -4 \\ 2\sqrt{3} & -2\sqrt{3} & 0 \end{bmatrix},$$

where h is a finite positive constant, which is constant in normal operation. In other words, the constant h is not signal-adaptive. However, it may be varied as part of tuning procedure, which is preferably to be carried out only between operating sessions. Hence, h is a non-adaptive constant, a current value of which may be transmitted as metadata in an output bitstream B from the encoding system 600. The transformation is orthogonal if $h=\sqrt{2}$.

Optionally, either one of pre-conditioning stage 623 the combined spatial analyzer and adaptive rotation stage 624 and multichannel encoder 625 may comprise an analysis stage (not shown) configured to output a time-variable gain profile based on the audio input to the respective stage. The gain profile comprises at least one frequency-variable component for attenuating non-voice content. The gain profile may be supplied to the multiplexer 626.

FIG. 7 shows an embodiment of a sound field audio decoding system 700. From an incoming bitstream B, a demultiplexer 771 extracts a multichannel bitstream $b_{3ch}$, decomposition parameters d, $\varphi$, $\theta$, spectral envelope information Env and noise offset No. The bitstream B may be prepared by an adaptive audio encoding system of the type shown in FIG. 6. The decoding system 700 may receive the decomposition parameters in quantized form, which may then have originated from a quantizing process, but since the system need not be aware of this to perform its operations, no assumption is made on this point, and neutral notation d, $\varphi$, $\theta$ is used.

A multichannel decoder 772 outputs, based on the multichannel bitstream $b_{3ch}$, the spectral envelope Env and the noise offset No, restored rotated audio signals E1, E2, E3. The multichannel decoder 772 may include an inverse quantizer which outputs restored (de-quantized) transform coefficients of the restored rotated audio signals on the basis of quantized transform coefficients $b_{E1}$, $b_{E2}$, $b_{E3}$ relating to those subbands for which transform coefficients are available and further on the basis of the noise offset No and the spectral envelope Env.

An adaptive rotation inversion stage 774 in the adaptive audio decoding system 700 receives the decomposition parameters d, $\varphi$, $\theta$, from which it derives coefficients for use in a linear combination of the restored rotated audio signals. The output of the adaptive rotation inversion stage 774 is de-rotated audio signals $\hat{W}$, $\hat{X}$, $\hat{Y}$. The coefficients in the linear combination may be proportional to the elements in an inverse of the matrix V(d, $\varphi$, $\theta$) defined above. A post-processing stage 775 provides restored output audio signals $\hat{L}$, $\hat{R}$, $\hat{S}$ on the basis of the de-rotated audio signals $\hat{W}$, $\hat{X}$, $\hat{Y}$. The post-processing stage 775 may be configured to apply the inverse of the matrix P(h) defined above. If the coefficient h is variable, its value may be transmitted as part of the bitstream. A rendering section 776 supplies a drive signal to an optional, sound-field-enabled playback device 777 based on the restored output audio signals $\hat{L}$, $\hat{R}$, $\hat{S}$. The decoding system 700 further comprises a frequency-to-time transform arranged downstream of the multichannel decoder 772, such as in one of the locations indicated by reference signs 773, 778 and 779.

Optionally, the demultiplexer may additionally extract a gain profile from the bitstream B, and either one of the multichannel decoder 772, the adaptive rotation inversion stage 774 and the post-processing stage 775 may comprise a cleaning stage (not shown) adapted to apply the gain profile to the audio input of the respective stage (or decoder).

Figure 8:
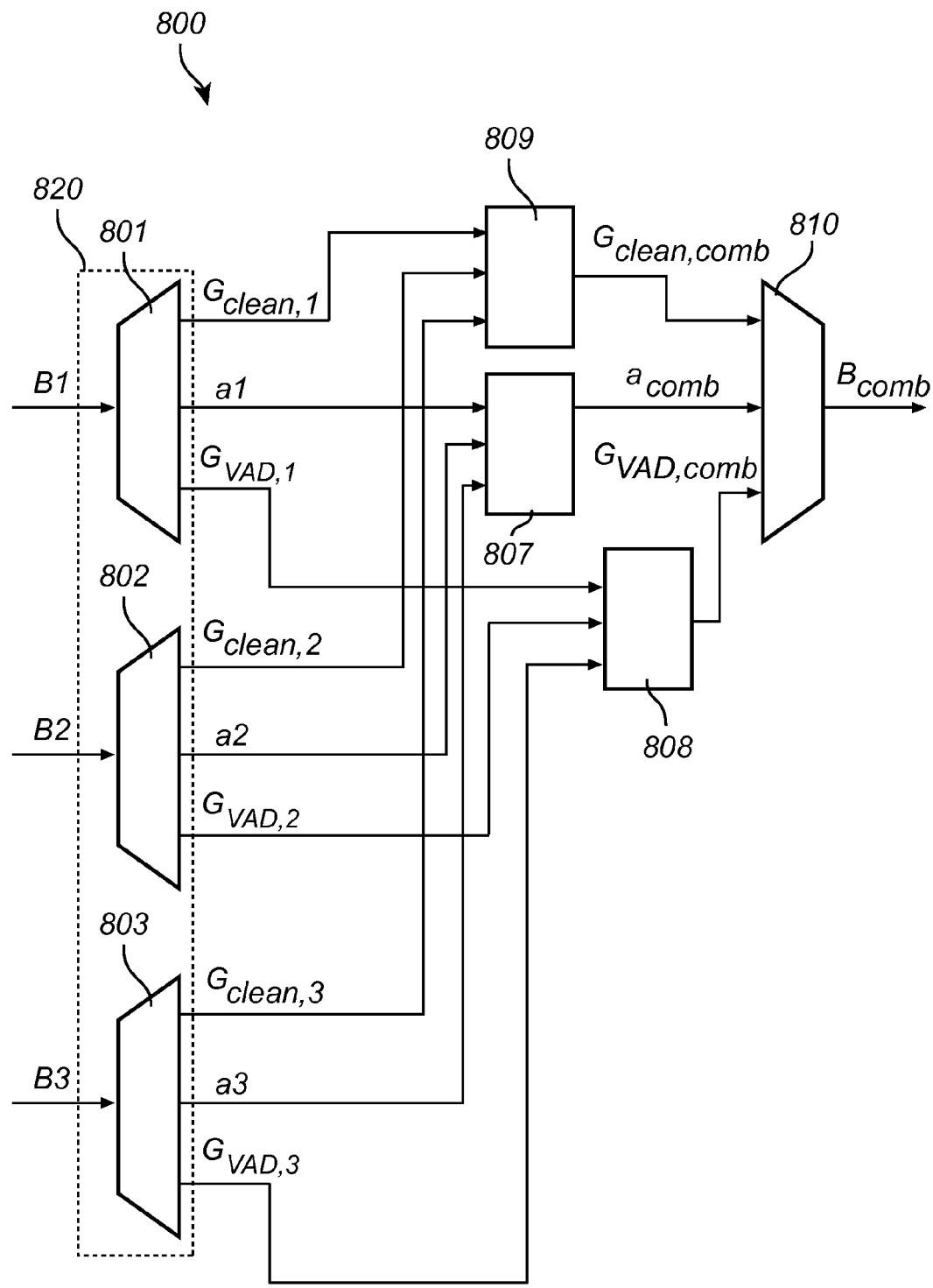
FIG. 8 shows a mixing system according to an embodiment of the invention.

FIG. 8 shows a mixing system combining a plurality of received pairs of audio signals and gain profiles. The audio signals a1, a2, a3 are received encoded in bitstreams B1, B2 and B3, respectively, together with gain profiles comprising time-variable and frequency-variable cleaning gains $G_{clean,1}$, $G_{clean,2}$, $G_{clean,3}$ and time-variable voice activity gains $G_{VAD,1}$, $G_{VAD,2}$, $G_{VAD,3}$, respectively. A decoder stage 820 comprises demultiplexers 801, 802, 803 deriving the respective audio signals and gain profile components from the respective bitstreams B1, B2, B3.

A gain combining stage, comprising a voice activity gain combiner 808 and a cleaning gain combiner 809, determines a combined voice activity gain $G_{VAD,comb}$ and a combined cleaning gain $G_{clean,comb}$. The voice activity combiner 808 receives the voice activity gains $G_{VAD,1}$, $G_{VAD,2}$, $G_{VAD,3}$ and forms the combined voice activity gain $G_{VAD,comb}$ using a first combining rule. For example, the first combining rule may be to pick the maximum of the received voice activity gains, i.e., picking the gain achieving the lowest attenuating amount of the received voice activity gains. Such a maximum may be chosen per time frame if the signals and gains are segmented into time frames; otherwise, it may be based on time averages during time periods or maxima/minima during time periods. The cleaning gain combiner 809 receives the cleaning gains $G_{clean,1}$, $G_{clean,2}$, $G_{clean,3}$ and forms the combined cleaning gain $G_{clean,comb}$ using a second combining rule, different from the first combining rule. As the cleaning gain is frequency-variable, the second combining rule may, at least in some embodiments, treat the different frequency subbands individually. For example, the second combining rule may be to form the combined cleaning gain by assigning, for each frequency subband, a combined cleaning gain achieving an attenuating amount equal to the highest attenuating amount of the derived cleaning gains in that frequency subband.

A mixing stage 807 combines the audio signals a1, a2, a3 into a combined audio signal $a_{comb}$ to be distributed with the combined voice activity gain $G_{VAD,comb}$ and the combined cleaning gain $G_{clean,comb}$. For example, the combined audio signal may be determined by assigning an average of the received audio signals a1, a2, a3, for each time instant, or time frame. The average may e.g. be a linear mean, a root mean square or a weighted average (wherein weights may be determined based on properties of the signals themselves or on properties of the accompanying gain profiles or gain components).

A multiplexer 810 may receive the combined cleaning gain $G_{clean,comb}$, the combined voice activity gain $G_{VAD,comb}$ and the combined audio signal $a_{comb}$, and may include/multiplex them into a combined bitstream $B_{comb}$.

Figure 10:
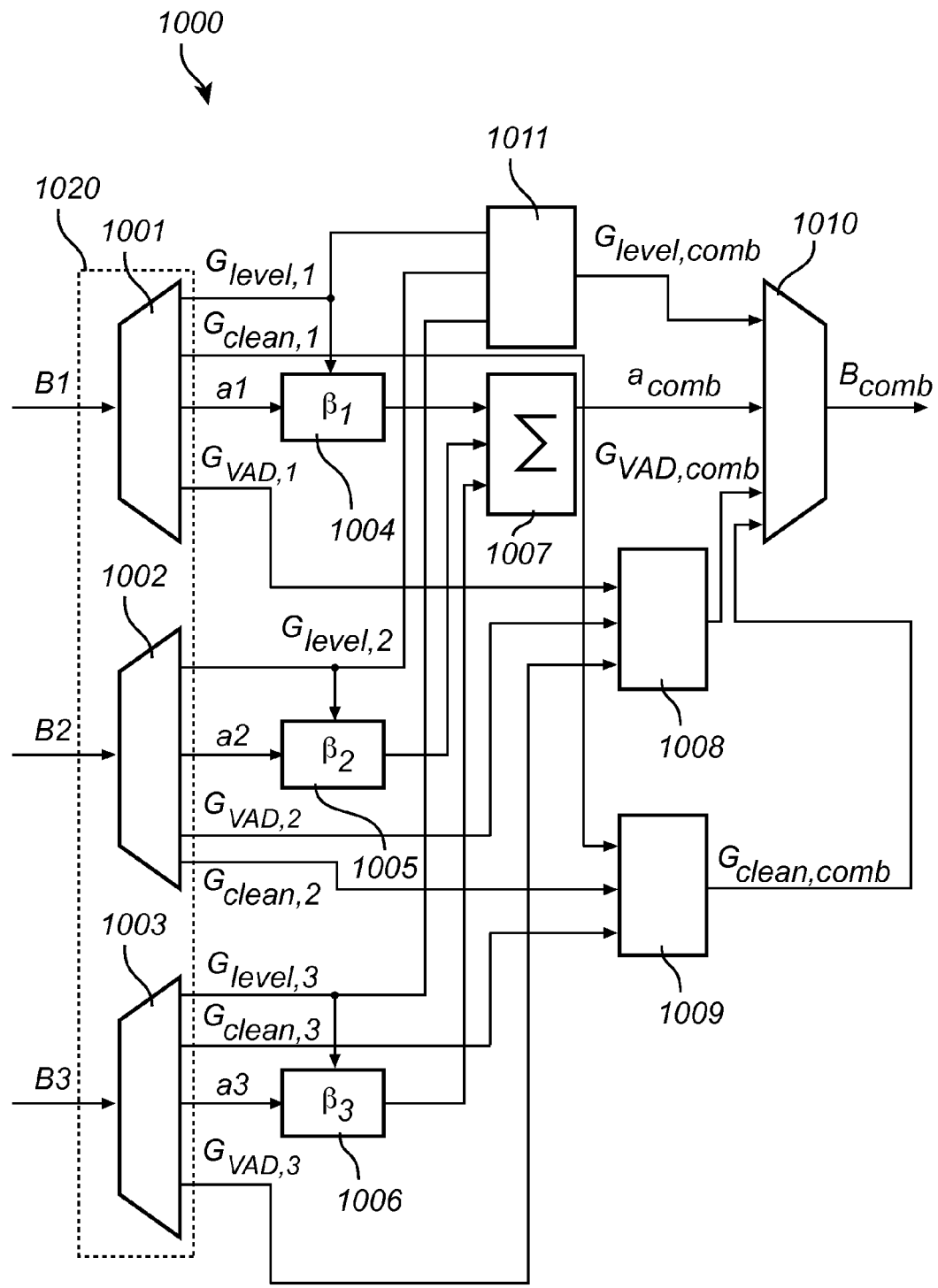
FIG. 10 shows a mixing system according to an embodiment of the invention.

FIG. 10 shows an alternative embodiment of a mixing system compared to the mixing system in FIG. 8. Audio signals a1, a2, a3 are received encoded in bitstreams B1, B2 and B3, respectively, together with gain profiles comprising time-variable level gains $G_{level,1}$, $G_{level,2}$, $G_{level,3}$, time-variable voice activity gains $G_{VAD,1}$, $G_{VAD,2}$, $G_{VAD,3}$ and time-variable and frequency-variable cleaning gains $G_{clean,1}$, $G_{clean,2}$, $G_{clean,3}$, respectively. Like in FIG. 8, a decoding stage 1020 comprising demultiplexers 1001, 1002, 1003 derives the respective audio signals and gain profile components from the respective bitstreams B1, B2, B3; a cleaning gain combiner 1009 combines the cleaning gains into a combined cleaning gain $G_{clean,comb}$; and a voice activity combiner 1007 combines the voice activity gains into a combined voice activity gain $G_{VAD,comb}$. In the present alternative embodiment, the gain combining stage further comprises a level gain combiner 1011, which receives the level gains $G_{level,1}$, $G_{level,2}$, $G_{level,3}$ and forms a combined level gain $G_{level,comb}$. For example, the level gain combiner 1007 may determine the combined level gain by picking the minimum of the level gains (considered as factors to be multiplied to audio signals), i.e. assigning a combined level gain achieving an attenuating amount equal to the highest attenuating amount of the derived level gains. A mixing stage combines the a1, a2, a3 into a combined audio signal $a_{comb}$. The mixing stage comprises multipliers 1004, 1005, 1006 (together forming a leveling stage) and a summer 1007. The respective audio signals a1, a2, a3 are multiplied (in the leveling stage) by respective factors $\beta_1$, $\beta_2$, $\beta_3$ at the respective multipliers 1004, 1005, 1006. The summer 1007 receives the output of the multipliers and computes a combined signal $a_{comb}$ by additively mixing (adding together) the respective outputs. For example, the combined audio signal may be expressed as $a_{comb}=\beta_1 a1+\beta_2 a2+\beta_3 a3$.

The factors $\beta_1$, $\beta_2$, $\beta_3$ may be determined based on the level gains $G_{level,1}$, $G_{level,2}$, $G_{level,3}$ which may reflect the signal level/loudness of the respective signals a1, a2, a3. For example, the first level gain $G_{level,i}$ may be inversely proportional to the received loudness of signal a1, and similarly for the other level gains and signals. The mixing stage may select one of the received level gains $G_{level,1}$, $G_{level,2}$, $G_{level,3}$ as a reference level/value. For example, it may select the level gain achieving the highest attenuating amount, i.e. if the gains correspond to amplification rather than attenuation, this corresponds to selecting the smallest amplifying amount, and if the gains are represented as scaling factors to be multiplied to the audio signals, this corresponds to selecting the smallest gain.

It is to be noted that a received audio signals may be inactive, i.e. temporarily contain no voice, and the associated level gain may then have an unspecified value, i.e. it may be much lower than the level gains of active audio signals, and may not be suitable as a combined level gain $G_{level,comb}$. Hence, in some example embodiments, the combined level gain may be determined by selecting the level gain achieving the highest attenuating amount of the level gains associated with currently active audio signals.

In one example, one has $$G_{level,1} \le G_{level,2} \text{ and } G_{level,1} \le G_{level,3},$$

so that the first level gain $G_{level,i}$ is selected as a reference value and $G_{1level,comb}=G_{level,1}$. The factors $\beta_1$, $\beta_2$, $\beta_3$ may then be calculated as $$\beta_{1=1}, \beta_2=G_{level,2}/G_{level,1} \text{ and } \beta_3=G_{level,3}/G_{level,1}$$

wherein clearly the first signal a1 is unaffected by the application of the factor $\beta_1$.

A multiplexer 1010 receives the combined level gain $G_{level,comb}$, the combined voice activity gain $G_{VAD,comb}$ and the combined signal $a_{comb}$, and includes/multiplexes them into a combined bitstream $B_{comb}$.

In some embodiments, the spatially layered encoding does not merely provide a simple layered (e.g., hierarchically layered) audio data format. Instead, it also includes metadata indicating differing amounts of pre-processing such as leveling, noise reduction and gating to be applied to each layer (or to each of at least one of the audio data layers). The transform or migration between the processing of different coding layers is preferably a very low cost operation, preferably with no requirement for parsing or recoding. As an example, consider a sound field output endpoint (e.g., telephone system with a microphone array and a pair of headphones) configured to render sound with full spatial fidelity, a wide dynamic range and room ambience. Consider also a monophonic output endpoint (telephone or PSTN receiver) which needs a highly compressed and conditioned component signal and mix. Typical embodiments of a method for selecting layers of spatially layered audio coding allow both such endpoints to operate per their full capabilities, in addition to providing bandwidth efficiency. Preferably, the method utilizes a full range of required signals (e.g., from cleaned monophonic audio through to full sound field encoded audio) in a way that allows for selective access and low complexity forwarding of the different signal components (layers) to match a receiver's capabilities, while making efficient use of all signals to reduce the encoded size (volume) of the transmitted data. Further details relating to such functionalities are to be found in the co-pending application entitled "Method and System for Selecting Layers of Encoded Audio Signals for Teleconferencing", referenced above.

In some embodiments, a voice conferencing system is an end to end solution for voice conferencing that utilizes an IP network for the data connections required across the system. The system supports creating an improved user experience through the utilization of multichannel spatial audio encoding where available to increase voice intelligibility and the plausible listening experience of a conference.

Some embodiments of the system implement multichannel spatial capture of a sound field at an appropriately configured endpoint, send cleaned and discontinuous voice segments across the system, and the server of the system combines them to achieve the required auditory scene at an endpoint. As much as possible, the server aggregates and forwards data, while avoiding decoding and mixing operations as much as possible. Captured mono streams can be rendered using positional information imparted by the server.

Multichannel sound field capture (using a microphone array) of sound uttered by one or more active conference participants typically allows a greater perceptual fidelity and naturalness of listening than monophonic capture by a single microphone. Captured audio is presented to the listener in accordance with typical embodiments in a way that is consistent with what might be experienced in a plausible acoustic environment, and this allows intermediate and high levels of binaural and spatial processing in the brain to assist in following the voice conference activity. The signals that are captured may be continuous, higher fidelity, less processed at the point of capture, multichannel and are typically a composite of sound from multiple sources. This is in contrast to a conventional system, in which efforts are taken at the capture point to create a single object or voice capture that is cleaned (noise removal) and broken into segments of activity.

A set of additional embodiments include a system or device configured (e.g., programmed) to perform any embodiments described above (or in the claims), and a computer readable medium (e.g., a disc) which stores code for implementing any method embodiments or steps thereof. For example, a system or device according to an embodiment, can be or include a programmable general purpose processor, digital signal processor, or microprocessor, programmed with software or firmware and/or otherwise configured to perform any of a variety of operations on data, including a method embodiment or steps thereof. Such a general purpose processor may be or include a computer system including an input device, a memory, and a processing subsystem that is programmed (and/or otherwise configured) to perform a method embodiment (or steps thereof) in response to data asserted thereto.

IV. EQUIVALENTS, EXTENSIONS, ALTERNATIVES AND MISCELLANEOUS

Each of the systems shown in FIGS. 2-5 and 8-10 (at least parts of FIGS. 1, 6 and 7) may be implemented as a configurable (e.g., programmable) digital signal processor (DSP) that is configured (e.g., programmed and otherwise configured) to perform required processing on audio signals, including performance of a method embodiment.

Alternatively, the systems shown in FIGS. 2-5 and 8-10 (and at least parts of FIGS. 1, 6 and 7) may be implemented as a programmable general purpose processor (e.g., a PC or other computer system or microprocessor, which may include an input device and a memory) which is programmed with software or firmware and/or otherwise configured to perform any of a variety of operations including a method embodiment. A general purpose processor configured to perform a method embodiment would typically be coupled to an input device (e.g., a mouse and/or a keyboard), a memory, and a display device.

While specific embodiments of the present invention and applications of the invention have been described herein, it will be apparent to those of ordinary skill in the art that many variations on the embodiments and applications described herein are possible without departing from the scope of the invention described and claimed herein. For example, examples mentioned herein of time and/or frequency domain processing (and/or time-to-frequency transformation) of signals are intended as examples and are not intended to limit the claims to require any specific type of processing and/or transformation that is not explicit in the claims. It should be understood that while certain forms of the invention have been shown and described, the invention is not to be limited to the specific embodiments described and shown or the specific methods described. Example further embodiments are the following:

1. A spatial audio decoding system for providing a sound field representation of a plurality of audio signals, based on a first rotated audio signal, which is obtainable from said plurality of audio signals using an adaptive energy-compacting orthogonal transformation, a time-variable gain profile comprising at least one frequency-variable component which when applied to at least one of the plurality of rotated audio signals, or at least one signal derived therefrom, attenuates non-voice content, and spatial parameters, the spatial audio decoding system comprising:

a cleaning stage adapted to receive the time-variable gain profile and the first rotated audio signal and to obtain and output a modified rotated audio signal by applying the time-variable gain profile to the first rotated audio signal; and a spatial synthesis stage adapted to synthesize said sound field representation of said plurality of audio signals by performing spatial synthesis based on said modified rotated audio signal and said spatial parameters.

2. A spatial audio decoding system for providing a sound field representation of a plurality of audio signals, based on a first rotated audio signal, which is obtainable from said plurality of audio signals using an adaptive energy-compacting orthogonal transformation, a time-variable gain profile comprising at least one frequency-variable component which when applied to at least one of the plurality of rotated audio signals, or at least one signal derived therefrom, attenuates non-voice content, and spatial parameters, the spatial audio decoding system comprising:

a spatial synthesis stage adapted to synthesize a temporary sound field representation of said plurality of audio signals by performing spatial synthesis based on said first rotated audio signal and said spatial parameters; and a cleaning stage adapted to receive the time-variable gain profile and said temporary sound field representation and to obtain and output said sound field representation of the plurality of audio signals by applying the time-variable gain profile to the temporary sound field representation.

3. A sound field audio decoding system for providing a sound field representation of a plurality of audio signals, based on a plurality of rotated audio signals, which is obtainable from said plurality of audio signals using an adaptive energy-compacting orthogonal transformation, a time-variable gain profile (g) comprising at least one frequency-variable component which when applied to at least one of the plurality of rotated audio signals, or at least one signal derived therefrom, attenuates non-voice content, and decomposition parameters, the sound field audio decoding system comprising:
an adaptive rotation inversion stage configured to discretely decode said plurality of rotated audio signals into a temporary sound field representation based on said decomposition parameters, and
a cleaning stage adapted to receive the time-variable gain profile and the temporary sound field representation, and to obtain and output said sound field representation of the plurality of audio signals by applying the time-variable gain profile to the temporary sound field representation.

4. The system of any of the embodiments 1 to 3, wherein the adaptive energy-compacting orthogonal transformation is constrained, so as to limit changes therein with respect to time.

5. The system of any of the embodiments 1 to 4, wherein a first rotated audio signal, of said plurality of rotated audio signals, is a dominant signal of said plurality of rotated audio signals.

6. An audio encoding system for producing, based on an audio signal, a gain profile (g) to be distributed with said audio signal, the gain profile comprising a time-variable first gain and a time-variable and frequency-variable second gain, wherein the audio encoding system comprises:
a first audio analyzer (42) adapted to determine the first gain based on said audio signal; and
a second audio analyzer (46, 48, 90) adapted to determine the second gain based on said audio signal,
wherein the first gain is separable from the second gain in the gain profile.

7. The audio encoding system of embodiment 6, wherein the second gain is a cleaning gain ($G_{clean}$) and the second audio analyzer is a noise estimator adapted to determine the cleaning gain by at least estimating noise in said audio signal.

8. The audio encoding system of embodiment 6 or 7, wherein the first gain is a voice activity gain ($G_{VAD}$) and the first audio analyzer is a voice activity detector adapted to determine the voice activity gain by at least determining voice activity in the audio signal.

9. An audio encoding system for producing, based on an audio signal, a gain profile (g) to be distributed with said audio signal, the gain profile comprising a voice activity gain ($G_{VAD}$) and a level gain ($G_{level}$), wherein the audio encoding system comprises:
a voice activity analyzer (42) adapted to determine the voice activity gain by determining voice activity in the audio signal; and
a loudness analyzer (50) adapted to determine the level gain by determining loudness of the audio signal,
wherein the voice activity gain and the level gain are mutually independent time-variable broadband gains.

10. The audio encoding system of embodiment 9, wherein the audio signal is segmented into time frames, and wherein at least one of the voice activity analyzer and the signal level analyzer is adapted to encode its respective determined gain on a per time frame basis, the encoding of a time frame being independent of previous time frames.

What is claimed is:
1. An audio encoding system, comprising:
a spatial analyzer configured to receive a plurality of audio signals, and to output, based thereon, decomposition parameters;
an adaptive rotation stage configured to receive said plurality of audio signals and to output a plurality of rotated audio signals obtained by an adaptive energy-compacting orthogonal transformation, wherein quantitative properties of the transformation are determined by the decomposition parameters, and wherein the plurality of rotated audio signals and the decomposition parameters are discretely decodable into a first sound field representation; and
an analysis stage configured to output, based on said plurality of audio signals, a time-variable gain profile comprising at least one frequency-variable component for attenuating non-voice content when applied to at least one of the plurality of rotated audio signals, at least one of de-rotated versions of the plurality of rotated audio signal, or another sound field representation of at least one of the plurality of rotated audio signals, wherein the analysis stage is further adapted to output, based on said plurality of audio signals, spatial parameters adapted for use in spatial synthesis of a first rotated audio signal,
wherein the audio encoding system is operable to suspend output of a set of signals selected from the group comprising:
said decomposition parameters and all of said plurality of rotated audio signals, except said first rotated audio signal; and
said spatial parameters, said decomposition parameters and all of said plurality of rotated audio signals, except said first rotated audio signal.

2. The audio encoding system of claim 1, wherein the adaptive energy-compacting orthogonal transformation is constrained, so as to limit variations with respect to time.

3. The audio encoding system of claim 1, wherein a first rotated audio signal of said plurality of rotated audio signals is a dominant signal of said plurality of rotated audio signals.

4. The audio encoding system of claim 1, wherein the analysis stage is further adapted to output, based on said plurality of audio signals, the spatial parameters adapted for use in spatial synthesis of a first rotated audio signal, or a modified version of the first rotated audio signal, into a second sound field representation different from the first sound field representation, wherein said first rotated audio signal is comprised in said plurality of rotated audio signals.

5. The audio encoding system of claim 4, wherein a time resolution of said spatial parameters is relatively lower than a time resolution of said decomposition parameters.

6. The audio encoding system of claim 4, wherein the analysis stage is adapted to perform an auditory scene analysis based on said plurality of audio signals, and to output said spatial parameters based on the auditory scene analysis.

7. The audio encoding system of claim 1, wherein the spatial analyzer is adapted to periodically estimate covariances of said plurality of audio signals and, optionally, to performing eigen-analysis based thereon.

8. The audio encoding system of claim 7, wherein the spatial analyzer is adapted to perform temporal smoothing of successive estimated covariance values.

9. The audio encoding system of claim 1, further comprising:
a time-invariant pre-conditioning stage configured to output said plurality of audio signals based on one or more input audio signals.

10. The audio encoding system of claim 9, wherein said one or more input audio signals, based on which the audio signals are provided, constitute an equal number of input audio signals obtainable by three angularly distributed directive transducers.

11. The audio encoding system of claim 1, further comprising:
a multiplexer configured to multiplex at least the decomposition parameters, the plurality of rotated audio signals and the gain profile into a bitstream.

12. The audio encoding system of claim 1, further comprising:
a multiplexer adapted to output a multilayered signal having:
a monophonic layer comprising the first rotated audio signal and the gain profile;
a first sound field layer comprising the first rotated audio signal, the gain profile and the spatial parameters; and
a second sound field layer comprising the plurality of rotated audio signals, the gain profile and the decomposition parameters.

13. The audio encoding system of claim 1, wherein the spatial analyzer is further configured to quantize said decomposition parameters before supplying them to the adaptive rotation stage.

14. The audio encoding system of claim 1, wherein said plurality of rotated audio signals comprises at least three signals.

15. An audio encoding method comprising:
determining decomposition parameters on the basis of a plurality of audio signals;
rotating the plurality of audio signals into a plurality of rotated audio signals using an adaptive energy-compacting orthogonal transform, wherein quantitative properties of the orthogonal transformation are determined by the decomposition parameters;
determining, based on said plurality of audio signals, a time-variable gain profile comprising at least one frequency-variable component for attenuating non-voice content when applied to at least one of the plurality of rotated audio signals, at least one of de-rotated versions of the plurality of rotated audio signal, or another sound field representation of at least one of the plurality of rotated audio signals;
outputting the decomposition parameters, the plurality of rotated audio signals, the time-variable gain profile and based on said plurality of audio signals, spatial parameters adapted for use in spatial synthesis of a first rotated audio signal; and
suspending output of a set of signals selected from the group comprising:
said decomposition parameters and all of said plurality of rotated audio signals, except said first rotated audio signal; and
said spatial parameters, said decomposition parameters and all of said plurality of rotated audio signals, except said first rotated audio signal.

16. A sound field audio decoding system for providing a sound field representation of a plurality of audio signals based on a plurality of rotated audio signals, the sound field representation obtainable from said plurality of audio signals using an adaptive energy-compacting orthogonal transformation, a time-variable gain profile comprising at least one frequency-variable component attenuating non-voice content when applied to at least one of the plurality of rotated audio signals, at least one of de-rotated versions of the plurality of rotated audio signal, or another sound field representation of at least one of the plurality of rotated audio signals, and decomposition parameters,
the sound field audio decoding system comprising:
a cleaning stage adapted to receive the time-variable gain profile and the plurality of rotated audio signals and to obtain and output a plurality of modified rotated audio signals by applying the time-variable gain profile to the plurality of rotated audio signals; and
an adaptive rotation inversion stage configured to discretely decode said plurality of modified rotated audio signals into said sound field representation based on said decomposition parameters.

17. The sound field audio decoding system of claim 16, further comprising
a demultiplexer configured to obtain the plurality of rotated audio signals, the time-variable gain profile and the decomposition parameters from one bitstream comprising the decomposition parameters, the time-variable gain profile, spatial parameters adapted for use in spatial synthesis of a first rotated audio signal of the plurality of audio signals, and a the plurality of rotated audio signals.

18. The sound field audio decoding system of claim 16, further comprising a downscaling section operable to receive the time-variable gain profile and to supply the cleaning stage with a downscaled gain profile, causing the cleaning stage to output a plurality of modified rotated audio signals being more similar to the plurality of rotated audio signals than is a plurality of modified rotated audio signals obtainable by applying a non-downscaled version of the gain profile to the plurality of rotated audio signals.

* * * * *